United States Patent
Si et al.

(10) Patent No.: US 10,673,995 B2
(45) Date of Patent: *Jun. 2, 2020

(54) DATA PROCESSING METHOD AND APPARATUS

(71) Applicant: Huawei Technologies Co., Ltd., Shenzhen (CN)

(72) Inventors: Penghao Si, Shenzhen (CN); Zhijun Li, Beijing (CN); Zhiqiang Chen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/380,559

(22) Filed: Apr. 10, 2019

(65) Prior Publication Data
US 2019/0238666 A1 Aug. 1, 2019

Related U.S. Application Data

(63) Continuation of application No. 15/719,063, filed on Sep. 28, 2017, now Pat. No. 10,306,028, which is a (Continued)

(51) Int. Cl.
*H04L 29/08* (2006.01)
*H04L 12/64* (2006.01)
*H04L 25/14* (2006.01)

(52) U.S. Cl.
CPC ........ *H04L 69/324* (2013.01); *H04L 12/6418* (2013.01); *H04L 25/14* (2013.01); *H04L 69/323* (2013.01)

(58) Field of Classification Search
CPC ..... H04L 69/324; H04L 69/323; H04L 25/14; H04L 12/6418
See application file for complete search history.

(56) References Cited

U.S. PATENT DOCUMENTS

| 7,957,391 B1 * | 6/2011 | Subramanian .......... H04L 5/003 370/394 |
| 8,165,162 B2 | 4/2012 | Frazier |

(Continued)

FOREIGN PATENT DOCUMENTS

| CN | 101309258 A | 11/2008 |
| CN | 102740170 A | 10/2012 |

(Continued)

OTHER PUBLICATIONS

Machine Translation and Abstract of Chinese Publication No. CN102740170, Oct. 17, 2012, 9 pages.

(Continued)

*Primary Examiner* — Vinncelas Louis
(74) *Attorney, Agent, or Firm* — Conley Rose, P.C.

(57) ABSTRACT

A data processing method and apparatus are presented, which relate to the communications field and are helpful in improving flexibility and expanding application scenarios. A first physical layer coding data block flow and a second physical layer coding data block flow are received; a first data flow is obtained according to the first physical layer coding data block flow and the second physical layer coding data block flow; multiple subframe headers are generated; a second data flow is obtained according to the first data flow and the multiple subframe headers; and data blocks in the second data flow are distributed to a first physical medium dependent (PMD) sublayer circuit and to a second PMD sublayer circuit, so as to obtain a first PMD sublayer data flow and a second PMD sublayer data flow. The data processing method and apparatus are used for data processing.

20 Claims, 18 Drawing Sheets

Related U.S. Application Data continuation of application No. PCT/CN2015/075426, filed on Mar. 30, 2015.

(56) References Cited

U.S. PATENT DOCUMENTS

| | | | |
|---|---|---|---|
| 8,488,450 | B2 | 7/2013 | Frazier et al. |
| 9,538,526 | B2* | 1/2017 | You .................. H03M 13/353 |
| 2009/0274172 | A1 | 11/2009 | Shen et al. |
| 2013/0139027 | A1 | 5/2013 | Diab et al. |
| 2016/0094311 | A1 | 3/2016 | Su et al. |
| 2016/0191277 | A1 | 6/2016 | Li et al. |
| 2017/0170925 | A1* | 6/2017 | Xu ........................ H04L 1/00 |

FOREIGN PATENT DOCUMENTS

| | | |
|---|---|---|
| CN | 103502985 A | 1/2014 |
| CN | 103797742 A | 5/2014 |
| CN | 104426631 A | 3/2015 |
| EP | 3041157 A | 7/2016 |
| WO | 2015027755 A | 3/2015 |

OTHER PUBLICATIONS

Machine Translation and Abstract of Chinese Publication No. CN103502985, Jan. 8, 2014, 46 pages.

"IEEE Standard for Ethernet, Section Six" IEEE Std 802.3, 2012, 400 pages.

Foreign Communication From a Counterpart Application, PCT Application No. PCT/CN2015/075426, English Translation of International Search Report dated Jan. 4, 2016, 2 pages.

Foreign Communication From a Counterpart Application, PCT Application No. PCT/CN2015/075426, English Translation of Written Opinion dated Jan. 4, 2016, 7 pages.

Foreign Communication From a Counterpart Application, Chinese Application No. 201580001126.3, Chinese Office Action dated Oct. 10, 2018, 6 pages.

Foreign Communication From a Counterpart Application, European Application No. 15886848.9, Extended European Search Report dated Feb. 12, 2018, 4 pages.

Notice of Allowance dated Jan. 10, 2019, U.S. Appl. No. 15/719,063, filed Sep. 28, 2017, 24 pages.

\* cited by examiner

DATA PROCESSING METHOD AND APPARATUS

CROSS-REFERENCE TO RELATED APPLICATIONS

This application is a continuation of U.S. patent application Ser. No. 15/719,063, filed on Sep. 28, 2017, which is a continuation of International Application No. PCT/CN2015/075426, filed on Mar. 30, 2015. All of the aforementioned patent applications are hereby incorporated by reference in their entireties.

TECHNICAL FIELD

The present disclosure relates to the communications field, and in particular, to a data processing method and apparatus.

BACKGROUND

Currently, traffic of a telecommunication backbone network is rapidly increasing at a speed of 50%-80% each year. The 802.3 working group of the Institute of Electrical and Electronics Engineers (IEEE) works for standardization of a 100-gigabit Ethernet (GE) interface. For a further Ethernet interface, there may be a 400GE Ethernet interface and a 1-terabit Ethernet (TE) interface.

An Ethernet interface may be implemented using a media access controller (MAC and a physical layer (PHY) circuit. In an implementation manner of the Ethernet interface, one MAC is connected to only one PHY. In another implementation manner of the Ethernet interface, one MAC is connected to multiple PHYs. FIG. 1 is a schematic structural diagram of an Ethernet interface. Referring to FIG. 1, after receiving a packet flow, a MAC may generate data block flows according to the packet flow and distribute the multiple data block flows to a PHY1, a PHY2, and a PHY3. In addition, after receiving a packet, the MAC may generate multiple data blocks according to the packet and send the multiple data blocks to one PHY (for example, the PHY 1) of the PHY1, the PHY2, and the PHY3. The foregoing technical solutions are not flexible enough, and application scenarios are relatively limited.

SUMMARY

Embodiments of the present disclosure provide a data processing method and apparatus, which are helpful in improving flexibility and expanding application scenarios.

To achieve the foregoing objective, the following technical solutions are used in the embodiments of the present disclosure.

According to a first aspect, a data processing method is provided, including receiving a first physical layer coding data block flow and a second physical layer coding data block flow; obtaining a first data flow according to the first physical layer coding data block flow and the second physical layer coding data block flow, where the first data flow includes data blocks from the first physical layer coding data block flow and data blocks from the second physical layer coding data block flow, and a ratio of a rate of the data blocks that are from the first physical layer coding data block flow are in the first data flow to a rate of the data blocks that are from the second physical layer coding data block flow and are in the first data flow is equal to a ratio of a rate of the first physical layer coding data block flow to a rate of the second physical layer coding data block flow; generating multiple subframe headers, where the multiple subframe headers are obtained according to a frame header, the frame header includes multiple payload fields, and the multiple subframe headers include the multiple payload fields, where each subframe header includes only one payload field and a subframe header marker field used to indicate whether the only one payload field is the first subframe header in the multiple subframe headers, each subframe header is one or more data blocks, the multiple subframe headers further include multiple beginning flag fields, and each subframe header includes only one beginning flag field, where the only one beginning flag field is used to indicate a start of a subframe header in which the only one beginning flag field is located, and the only one beginning flag field is a data block; obtaining a second data flow according to the first data flow and the multiple subframe headers, where the second data flow includes the first data flow and the multiple subframe headers; and distributing data blocks in the second data flow to a first physical medium dependent (PMD) sublayer circuit and to a second PMD sublayer circuit, so as to obtain a first PMD sublayer data flow and a second PMD sublayer data flow, where the first PMD sublayer circuit corresponds to the first PMD sublayer data flow, and the second PMD sublayer circuit corresponds to the second PMD sublayer data flow.

With reference to the first aspect, in a first possible implementation manner, the first PMD sublayer data flow further includes a first PMD sublayer alignment marker, and the second PMD sublayer data flow further includes a second PMD sublayer alignment marker, where the first PMD sublayer alignment marker and the second PMD sublayer alignment marker are used to align the first PMD sublayer data flow with the second PMD sublayer data flow, a rate of the data blocks that are in the second data flow and are distributed to the first PMD sublayer circuit is R1, a rate of the data blocks that are in the second data flow and are distributed to the second PMD sublayer circuit is R2, a rate of the first PMD sublayer alignment marker in the first PMD sublayer data flow is R3, a rate of the second PMD sublayer alignment marker in the second PMD sublayer data flow is R4, bandwidth of the first PMD sublayer circuit is R5, and bandwidth of the second PMD sublayer circuit is R6, where (R1+R3)/(R2+R4)=R5/R6, R1+R3 is less than R5, R2+R4 is less than R6, R1 is greater than 0, R2 is greater than 0, R3 is greater than 0, R4 is greater than 0, R5 is greater than 0, and R6 is greater than 0.

With reference to the first possible implementation manner, in a second possible implementation manner, the first PMD sublayer data flow further includes an idle data block and a first physical layer overhead, and the second PMD sublayer data flow further includes an idle data block and a second physical layer overhead, where a rate of the idle data block in the first PMD sublayer data flow is R7, a rate of the idle data block in the second PMD sublayer data flow is R8, a rate of the first physical layer overhead in the first PMD sublayer data flow is R9, and a rate of the second physical layer overhead in the second PMD sublayer data flow is R10, where R1+R3+R7+R9 is equal to R5, and R2+R4+R8+R10 is equal to R6.

With reference to the first possible implementation manner or the second possible implementation manner, in a third possible implementation manner, the first data flow includes multiple sub-data flows, where a quantity of data blocks included in each sub-data flow is equal to C, a ratio of a rate of data blocks that are from the first physical layer coding data block flow and are in each sub-data flow to a rate of data blocks that are from the second physical layer coding data block flow and are in each sub-data flow is equal to the ratio of the rate of the first physical layer coding data block flow to the rate of the second physical layer coding data block flow, C is greater than or equal to 2, and C is an integer; and the frame header includes a length field, a flow quantity field, a first data block quantity field, and a second data block quantity field, where the length field is used to indicate a length of the frame header, the flow quantity field is used to indicate a quantity of physical layer coding data block flows included in the first data flow, the first data block quantity field is used to indicate a quantity of data blocks that are included in each sub-data flow and are from the first physical layer coding data block flow, and the second data block quantity field is used to indicate a quantity of data blocks that are included in each sub-data flow and are from the second physical layer coding data block flow.

With reference to the third possible implementation manner, in a fourth possible implementation manner, each subframe header in the multiple subframe headers in the second data flow is located between two adjacent sub-data flows in the multiple sub-data flows.

With reference to any possible implementation manner of the second to the fourth possible implementation manners, in a fifth possible implementation manner, the idle data block in the first PMD sublayer data flow and the idle data block in the second PMD sublayer data flow are deleted by a receive physical layer circuit before the frame header is generated according to the multiple subframe headers.

According to a second aspect, a data processing apparatus is provided, including a receiving unit configured to receive a first physical layer coding data block flow and a second physical layer coding data block flow; a first obtaining unit configured to obtain a first data flow according to the first physical layer coding data block flow and the second physical layer coding data block flow that are received by the receiving unit, where the first data flow includes data blocks from the first physical layer coding data block flow and data blocks from the second physical layer coding data block flow, and a ratio of a rate of the data blocks that are from the first physical layer coding data block flow to are in the first data flow to a rate of the data blocks that are from the second physical layer coding data block flow and are in the first data flow is equal to a ratio of a rate of the first physical layer coding data block flow to a rate of the second physical layer coding data block flow; a generating unit configured to generate multiple subframe headers, where the multiple subframe headers are obtained according to a frame header, the frame header includes multiple payload fields, and the multiple subframe headers include the multiple payload fields, where each subframe header includes only one payload field and a subframe header marker field used to indicate whether the only one payload field is the first subframe header in the multiple subframe headers, each subframe header is one or more data blocks, the multiple subframe headers further include multiple beginning flag fields, and each subframe header includes only one beginning flag field, where the only one beginning flag field is used to indicate a start of a subframe header in which the only one beginning flag field is located, and the only one beginning flag field is a data block; a second obtaining unit configured to obtain a second data flow according to the first data flow obtained by the first obtaining unit and the multiple subframe headers generated by the generating unit, where the second data flow includes the first data flow and the multiple subframe headers; and a distributing unit configured to distribute data blocks in the second data flow obtained by the second obtaining unit to a first physical medium dependent PMD sublayer circuit and to a second PMD sublayer circuit, so as to obtain a first PMD sublayer data flow and a second PMD sublayer data flow, where the first PMD sublayer circuit corresponds to the first PMD sublayer data flow, and the second PMD sublayer circuit corresponds to the second PMD sublayer data flow.

With reference to the second aspect, in a first possible implementation manner, the first PMD sublayer data flow further includes a first PMD sublayer alignment marker, and the second PMD sublayer data flow further includes a second PMD sublayer alignment marker, where the first PMD sublayer alignment marker and the second PMD sublayer alignment marker are used to align the first PMD sublayer data flow with the second PMD sublayer data flow, a rate of the data blocks that are in the second data flow and are distributed to the first PMD sublayer circuit is R1, a rate of the data blocks that are in the second data flow and are distributed to the second PMD sublayer circuit is R2, a rate of the first PMD sublayer alignment marker in the first PMD sublayer data flow is R3, a rate of the second PMD sublayer alignment marker in the second PMD sublayer data flow is R4, bandwidth of the first PMD sublayer circuit is R5, and bandwidth of the second PMD sublayer circuit is R6, where $(R1+R3)/(R2+R4)=R5/R6$, $R1+R3$ is less than R5, $R2+R4$ is less than R6, R1 is greater than 0, R2 is greater than 0, R3 is greater than 0, R4 is greater than 0, R5 is greater than 0, and R6 is greater than 0.

With reference to the first possible implementation manner, in a second possible implementation manner, the first PMD sublayer data flow further includes an idle data block and a first physical layer overhead, and the second PMD sublayer data flow further includes an idle data block and a second physical layer overhead, where a rate of the idle data block in the first PMD sublayer data flow is R7, a rate of the idle data block in the second PMD sublayer data flow is R8, a rate of the first physical layer overhead in the first PMD sublayer data flow is R9, and a rate of the second physical layer overhead in the second PMD sublayer data flow is R10, where $R1+R3+R7+R9$ is equal to R5, and $R2+R4+R8+R10$ is equal to R6.

With reference to the first possible implementation manner or the second possible implementation manner, in a third possible implementation manner, the first data flow includes multiple sub-data flows, where a quantity of data blocks included in each sub-data flow is equal to C, a ratio of a rate of data blocks that are from the first physical layer coding data block flow are in each sub-data flow to a rate of data blocks that are from the second physical layer coding data block flow and are in each sub-data flow is equal to the ratio of the rate of the first physical layer coding data block flow to the rate of the second physical layer coding data block flow, C is greater than or equal to 2, and C is an integer; and the frame header includes a length field, a flow quantity field, a first data block quantity field, and a second data block quantity field, where the length field is used to indicate a length of the frame header, the flow quantity field is used to indicate a quantity of physical layer coding data block flows included in the first data flow, the first data block quantity field is used to indicate a quantity of data blocks that are included in each sub-data flow and are from the first physical layer coding data block flow, and the second data block quantity field is used to indicate a quantity of data blocks that are included in each sub-data flow and are from the second physical layer coding data block flow.

With reference to the third possible implementation manner, in a fourth possible implementation manner, each subframe header in the multiple subframe headers in the second data flow is located between two adjacent sub-data flows in the multiple sub-data flows.

With reference to any possible implementation manner of the second to the fourth possible implementation manners, in a fifth possible implementation manner, the idle data block in the first PMD sublayer data flow and the idle data block in the second PMD sublayer data flow are deleted by a receive physical layer circuit before the frame header is generated according to the multiple subframe headers.

In the foregoing technical solutions, the data blocks in the second data flow is distributed to the first PMD sublayer circuit and to the second PMD sublayer circuit. The second data flow includes the data blocks in the first physical layer coding data block flow, the data blocks in the second physical layer coding data block flow, and the multiple subframe headers. The distributed data blocks include data blocks in a physical layer coding data block flow. In the prior art, a PHY includes a physical coding sublayer (PCS) circuit. The PCS circuit includes a physical layer coding circuit. The physical layer coding circuit may generate and output a physical layer coding data block flow. In the foregoing technical solutions, a distribution operation may be executed by the PHY. The PHY may execute the distribution operation after the physical layer coding circuit executes physical layer coding. In the prior art, the distribution operation is executed by a MAC. Therefore, the foregoing technical solutions are relatively flexible and are helpful in expanding application scenarios.

BRIEF DESCRIPTION OF DRAWINGS

To describe the technical solutions in the embodiments of the present disclosure or in the prior art more clearly, the following briefly introduces the accompanying drawings required for describing the embodiments or the prior art. The accompanying drawings in the following description show merely some embodiments of the present disclosure. A person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. Other embodiments obtained by a person of ordinary skill in the art based on the embodiments of the present disclosure without creative efforts shall fall within the protection scope of the present disclosure.

Figure 1:
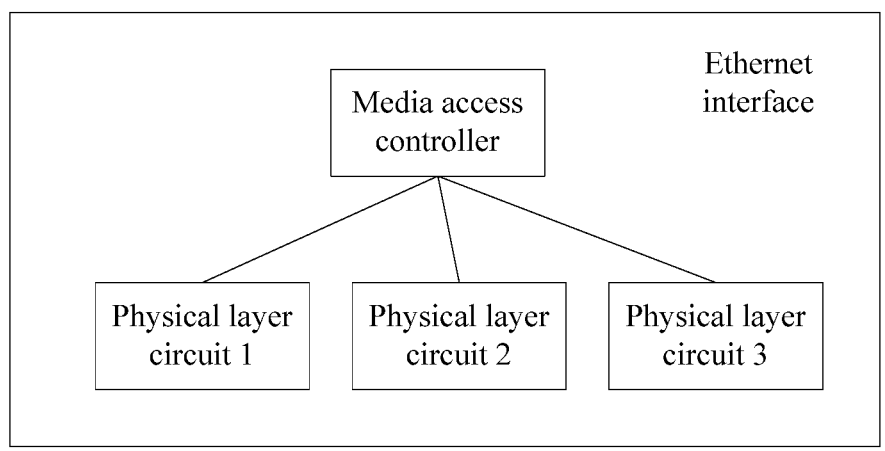
FIG. 1 is a schematic structural diagram of an Ethernet interface in the prior art.
Figure 2:
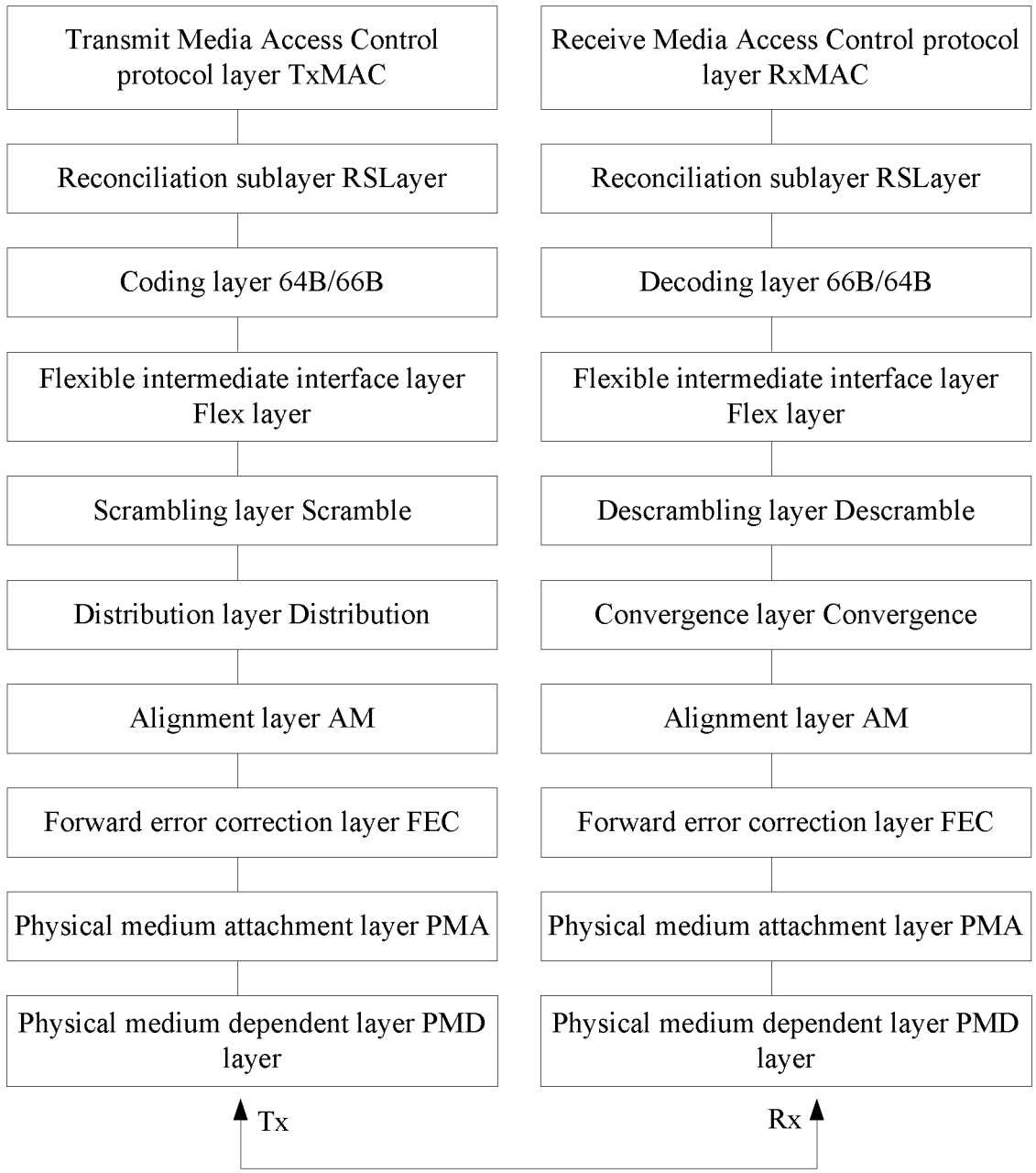
FIG. 2 is a schematic structural diagram of a communications system according to an embodiment of the present disclosure.

FIG. 2 is a schematic structural diagram of a communications system according to an embodiment of the present disclosure. The communications system may be used to execute a data processing method provide in the embodiment. The communications system includes a sending apparatus and a receiving apparatus. The sending apparatus includes an Ethernet interface. The receiving apparatus includes an Ethernet interface. The Ethernet interface in the sending apparatus includes a transmit Media Access Control protocol layer (Tx MAC), a reconciliation sublayer, a coding layer (64B/66B), a flexible intermediate interface layer (Flex inter layer), a scrambling (Scramble) layer, a distribution layer, an alignment layer, a forward error correction (FEC) layer, a physical medium attachment (PMA) layer, and a physical medium dependent (PMD) layer. The Ethernet interface in the receiving apparatus includes a receive Media Access Control protocol layer (Rx MAC), a reconciliation sublayer, a decoding layer (66B/64B), a flexible intermediate interface layer (Flex inter layer), a descrambling layer, a convergence layer, an alignment layer, a FEC layer, a PMA layer, and a PMD layer. The flexible intermediate interface layer may be used to implement a function of the data processing method provided in the embodiment. It should be pointed out that a layer and a sublayer mentioned in the foregoing solution are defined according to a function that needs to be executed. In specific implementation, the Ethernet interface may be implemented using circuits respectively corresponding to the foregoing layer and sublayer. For example, the coding layer corresponds to a coding layer circuit, the distribution layer corresponds to a distribution layer circuit, and the flexible intermediate interface layer corresponds to a flexible intermediate interface layer circuit. The flexible intermediate interface layer circuit may be used to implement the data processing method provided in the embodiment. In specific implementation, the sending apparatus and the receiving apparatus may be a chip or a multi-port Ethernet device (multi-port Ethernet device). The chip may be implemented using a field programmable gate array (FPGA) or an application-specific integrated circuit (ASIC). The chip may include a MAC and a PHY. The MAC and the PHY may be coupled using a media-independent interface (MII). In addition, the chip may be a component in a network interface card (NIC). The NIC may be a line card or a physical interface card (PIC). The multi-port Ethernet device may include the chip. For example, the multi-port Ethernet device may be a router, a network switch, a packet transport network (PTN) device, a firewall, a load balancer, a data center, or a wavelength-division multiplexing (WDM) device. For example, the network switch may be an OpenFlow switch.

Figure 3:
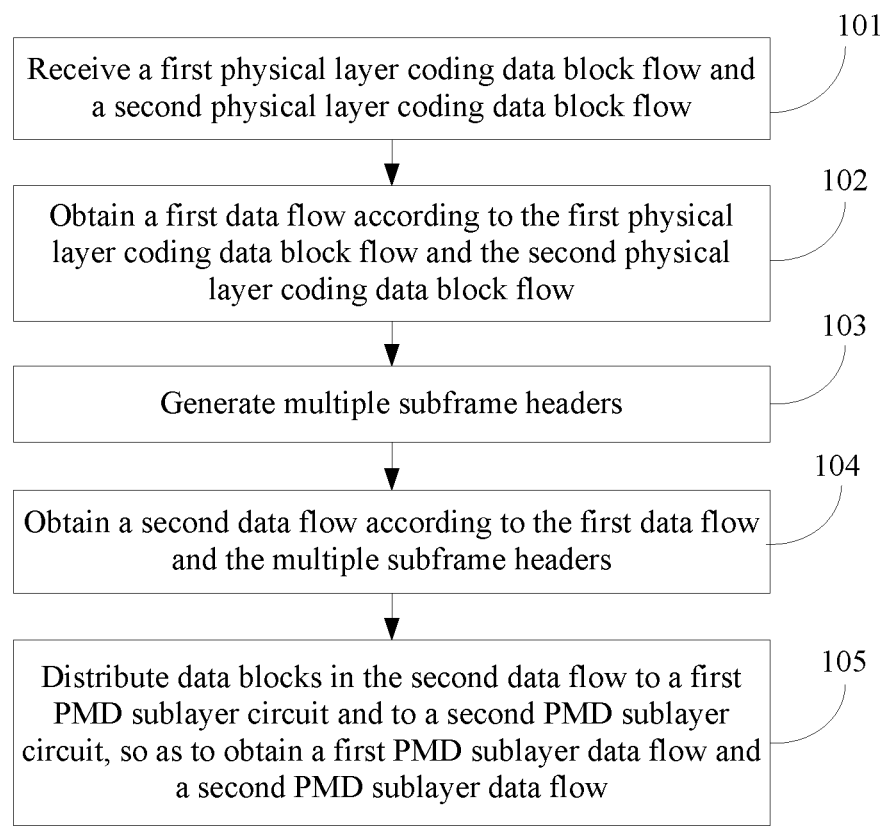
FIG. 3 is a flowchart of a data processing method according to an embodiment of the present disclosure.

FIG. 3 is a schematic flowchart of a data processing method according to an embodiment of the present disclosure. The method may be executed by a flexible intermediate interface layer circuit, a chip, or a multi-port Ethernet device. For the flexible intermediate interface layer circuit, the chip, and the multi-port Ethernet device, refer to the foregoing description, and details are not described herein again. In addition, the method may also be executed by a PHY. The method may be executed by a PCS circuit in the PHY. The PCS circuit may include a physical layer coding circuit, a flexible intermediate interface layer circuit, and a scrambling circuit. The flexible intermediate interface layer circuit may be coupled to the physical layer coding circuit and the scrambling circuit. The flexible intermediate interface layer circuit may receive a physical layer coding data block flow outputted by the physical layer coding circuit. The flexible intermediate interface layer circuit may generate a data flow according to the physical layer coding data block flow outputted by the physical layer coding circuit. A processing circuit may send the generated data flow to a PMD circuit using the scrambling circuit. Lengths of all data blocks involved in the embodiment corresponding to the method shown in FIG. 3 are equal. In addition, unless otherwise specified, lengths of data blocks involved in anther embodiment in the application document are all equal. As shown in FIG. 3, the method includes the following steps.

Step 101: Receive a first physical layer coding data block flow and a second physical layer coding data block flow.

For example, the first physical layer coding data block flow and the second physical layer coding data block flow may be generated by the physical layer coding circuit. The physical layer coding circuit may execute physical layer coding. The physical layer coding may be 4b/5b coding, 8b/10b coding, 64b/66b coding, or physical layer coding of another type. For details about the physical layer coding, reference may be made to the IEEE 802.3.

For example, a network processor (NP) or a traffic management (TM) chip may send a first packet flow and a second packet flow to the physical layer coding circuit. The physical layer coding circuit may generate the first physical layer coding data block flow according to a first data block flow corresponding to the first packet flow. The physical layer coding circuit may generate the second physical layer coding data block flow according to a second data block flow corresponding to the second packet flow.

The first packet flow includes multiple packets. The second packet flow includes multiple packets. The multiple packets in the first packet flow may be packets of a layer 2 protocol, packets of a layer 2.5 protocol, packets of a layer 3 protocol, or packets of a layer 4 protocol. For example, the layer 2 protocol may be the MAC protocol. The layer 2.5 protocol may be the Multiprotocol Label Switching (MPLS) protocol. The layer 3 protocol may be the Internet Protocol (IP). The layer 4 protocol may be the Transmission Control Protocol (TCP). For layer 2, layer 2.5, layer 3, or layer 4, refer to an open system interconnection reference model. The multiple packets in the second packet flow may also be the foregoing packets, and details are not described herein again.

For the first packet flow and the second packet flow, "first" and "second" are used to distinguish between packet flows with different characteristics. A characteristic of the first packet flow is different from a characteristic of the second packet flow. A packet header in the first packet flow is different from a packet header in the second packet flow.

For example, step 101 further includes receiving another physical layer coding data block flow. For example, a third physical layer coding data block flow is received. For the third physical layer coding data block flow, refer to the description about the first physical layer coding data block flow, and details are not described herein again. It should be pointed out that the third physical layer coding data block flow corresponds to a third packet flow. A characteristic of the third packet flow is different from the characteristic of the first packet flow. The characteristic of the third packet flow is different from the characteristic of the second packet flow.

Step 102: Obtain a first data flow according to the first physical layer coding data block flow and the second physical layer coding data block flow.

The first data flow includes data blocks from the first physical layer coding data block flow and data blocks from the second physical layer coding data block flow, where a ratio of a rate of the data blocks that are from the first physical layer coding data block flow and are in the first data flow to a rate of the data blocks that are from the second physical layer coding data block flow and are in the first data flow is equal to a ratio of a rate of the first physical layer coding data block flow to a rate of the second physical layer coding data block flow.

For example, the first data flow may include data blocks from the another physical layer coding data block flow. For example, the first data flow may include data blocks from the third physical layer coding data block flow.

Step 103: Generate multiple subframe headers.

The multiple subframe headers are obtained according to a frame header, the frame header includes multiple payload fields, and the multiple subframe headers include the multiple payload fields, where each subframe header includes only one payload field and a subframe header marker field used to indicate whether the only one payload field is the first subframe header in the multiple subframe headers, each subframe header is one or more data blocks, the multiple subframe headers further include multiple beginning flag fields, and each subframe header includes only one beginning flag field, where the only one beginning flag field is used to indicate a start of a subframe header in which the only one beginning flag field is located, and the only one beginning flag field is a data block.

For example, the frame header is used to describe the first data flow.

For example, the first subframe header is located at a start of the frame header. A location of the first subframe header in the frame header is before locations of other subframe headers in the multiple subframe headers in the frame header.

For example, a length of the subframe header marker field may be one bit. For example, that a value of the subframe header marker field is equal to 1 indicates that only one sub-payload message field is the first subframe header. That the value of the subframe header marker field is equal to 0 indicates that the only one sub-payload message field is not the first subframe header.

For example, the only one beginning flag field is located at the forefront of a subframe header in which the only one beginning flag field is located. A location of the only one beginning flag field in the subframe header in which the only one beginning flag field is located is before locations of other fields in the subframe header in which the only one beginning flag is located.

Step 104: Obtain a second data flow according to the first data flow and the multiple subframe headers.

The second data flow includes the first data flow and the multiple subframe headers.

Step 105: Distribute data blocks in the second data flow to a first PMD sublayer circuit and to a second PMD sublayer circuit, so as to obtain a first PMD sublayer data flow and a second PMD sublayer data flow.

The first PMD sublayer circuit corresponds to the first PMD sublayer data flow, and the second PMD sublayer circuit corresponds to the second PMD sublayer data flow.

In the foregoing technical solution, when step 105 is implemented, data blocks in the second data flow may also be distributed to another PMD sublayer circuit, so that another PMD sublayer data flow may be obtained.

For example, the data blocks in the second data flow may be distributed in a weighted round-robin (WRR) manner.

In the foregoing technical solution, the data blocks in the second data flow is distributed to the first PMD sublayer circuit and to the second PMD sublayer circuit. The second data flow includes the data blocks in the first physical layer coding data block flow, the data blocks in the second physical layer coding data block flow, and the multiple subframe headers. The distributed data blocks include a data blocks in a physical layer coding data block flow. In the prior art, a PHY includes a PCS circuit. The PCS circuit includes a physical layer coding circuit. The physical layer coding circuit may generate and output a physical layer coding data block flow. In the foregoing technical solution, a distribution operation may be executed by the PHY. The PHY may execute the distribution operation after the physical layer coding circuit executes physical layer coding. In the prior art, the distribution operation is executed by a MAC. Therefore, the foregoing technical solution is relatively flexible and is helpful in expanding application scenarios.

Optionally, in the foregoing technical solution, the first PMD sublayer data flow further includes a first PMD sublayer alignment marker, and the second PMD sublayer data flow further includes a second PMD sublayer alignment marker, where the first PMD sublayer alignment marker and the second PMD sublayer alignment marker are used to align the first PMD sublayer data flow with the second PMD sublayer data flow, a rate of the data blocks that are in the second data flow and are distributed to the first PMD sublayer circuit is R1, a rate of the data blocks that are in the second data flow and are distributed to the second PMD sublayer circuit is R2, a rate of the first PMD sublayer alignment marker in the first PMD sublayer data flow is R3, a rate of the second PMD sublayer alignment marker in the second PMD sublayer data flow is R4, bandwidth of the first PMD sublayer circuit is R5, and bandwidth of the second PMD sublayer circuit is R6, where (R1+R3)/(R2+R4)=R5/R6, R1+R3 is less than R5, R2+R4 is less than R6, R1 is greater than 0, R2 is greater than 0, R3 is greater than 0, R4 is greater than 0, R5 is greater than 0, and R6 is greater than 0.

For example, the first PMD sublayer alignment marker may be a data block. The second PMD sublayer alignment marker may be a data block.

In the foregoing technical solution, the data blocks in the second data flow are distributed to the first PMD sublayer circuit and to the second PMD sublayer circuit. Therefore, both the first PMD sublayer circuit and the second PMD sublayer circuit may receive the data blocks. In addition, according to (R1+R3)/(R2+R4)=R5/R6, it may be determined that a rate of data received by a PMD sublayer circuit is directly proportional to bandwidth of the PMD sublayer circuit. Therefore, in the foregoing solution, a resource of the PMD sublayer circuit can be fully used.

Optionally, in the foregoing technical solution, the first PMD sublayer data flow further includes an idle data block and a first physical layer overhead, and the second PMD sublayer data flow further includes an idle data block and a second physical layer overhead, where a rate of the idle data block in the first PMD sublayer data flow is R7, a rate of the idle data block in the second PMD sublayer data flow is R8, a rate of the first physical layer overhead in the first PMD sublayer data flow is R9, and a rate of the second physical layer overhead in the second PMD sublayer data flow is R10, where R1+R3+R7+R9 is equal to R5, and R2+R4+R8+R10 is equal to R6.

For example, the idle data block may be one idle data block or multiple idle data blocks. Lengths of all idle data blocks are equal. A length of an idle data block is equal to a length of a data block involved in this embodiment.

For example, the idle data block may be generated by the flexible intermediate interface layer circuit involved in the embodiment corresponding to FIG. 2.

Optionally, in the foregoing technical solution, the first data flow includes multiple sub-data flows, where a quantity of data blocks included in each sub-data flow is equal to C, a ratio of a rate of data blocks that are from the first physical layer coding data block flow are in each sub-data flow to a rate of data block that are from the second physical layer coding data block flow and are in each sub-data flow is equal to the ratio of the rate of the first physical layer coding data block flow to the rate of the second physical layer coding data block flow, C is greater than or equal to 2, and C is an integer.

The frame header includes a length field, a flow quantity field, a first data block quantity field, and a second data block quantity field, where the length field is used to indicate a length of the frame header, the flow quantity field is used to indicate a quantity of physical layer coding data block flows included in the first data flow, the first data block quantity field is used to indicate a quantity of data blocks that are included in each sub-data flow and are from the first physical layer coding data block flow, and the second data block quantity field is used to indicate a quantity of data blocks that are included in each sub-data flow and are from the second physical layer coding data block flow.

For example, the frame header may further include an extension field. The extension field may be used to carry other information. For example, the extension field may be used to carry a message channel field. For carrying of the message channel field, refer to an embodiment corresponding to FIG. 8, and details are not described herein again.

Optionally, in the foregoing technical solution, each subframe header in the multiple subframe headers in the second data flow is located between two adjacent sub-data flows in the multiple sub-data flows.

For example, two adjacent subframe headers in the multiple subframe headers in the second data flow are separated by P sub-data flows, where the P sub-data flows are sub-data flows in the multiple sub-data flows, and P is an integer.

Optionally, in the foregoing technical solution, the idle data block in the first PMD sublayer data flow and the idle data block in the second PMD sublayer data flow are deleted by a receive physical layer circuit (receive PHY) before the frame header is generated according to the multiple subframe headers.

For example, the method described in FIG. 3 may be executed by a transmit physical layer circuit (transmit PHY). The transmit physical layer circuit may send the first PMD sublayer data flow to the receive physical layer circuit using the first PMD sublayer circuit. The transmit physical layer circuit may send the second PMD sublayer data flow to the receive physical layer circuit using the second PMD sublayer circuit. After receiving the first PMD sublayer data flow, the receive physical layer circuit may delete the idle data block in the first PMD sublayer data flow. After receiving the second PMD sublayer data flow, the receive physical layer circuit may delete the idle data block in the second PMD sublayer data flow. Then, the receive physical layer circuit may generate the frame header according to the multiple subframe headers, and parse the first data flow according to the frame header.

Figure 4:
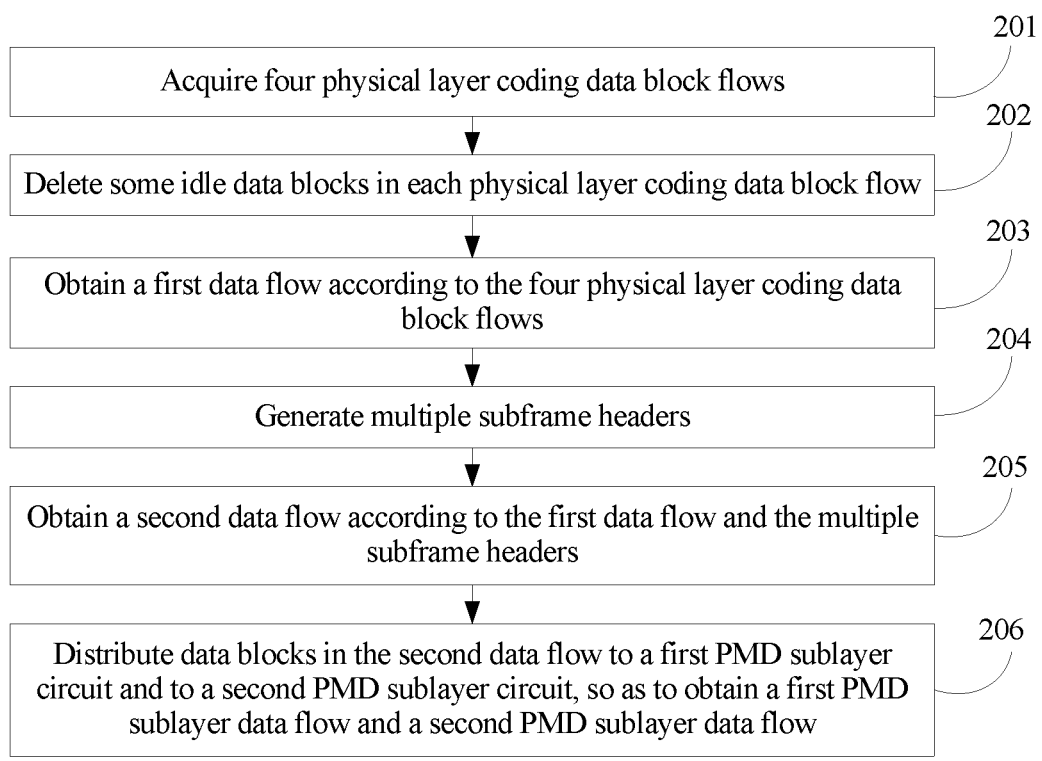
FIG. 4 is a flowchart of another data processing method according to an embodiment of the present disclosure.

FIG. 4 is a schematic flowchart of a data processing method according to an embodiment of the present disclosure. The method shown in FIG. 4 may be used to implement the method shown in FIG. 3. As shown in FIG. 4, the method includes the following steps.

Step 201: Acquire four physical layer coding data block flows.

Each physical layer coding data block flow includes data blocks, where the data blocks includes a valid data block and an idle data block, the valid data block is a data block carrying data that needs to be transmitted, and the idle data block is a data block that does not carry transmission data. The valid data block and the idle data block are 64B/66B data blocks.

Figure 5:
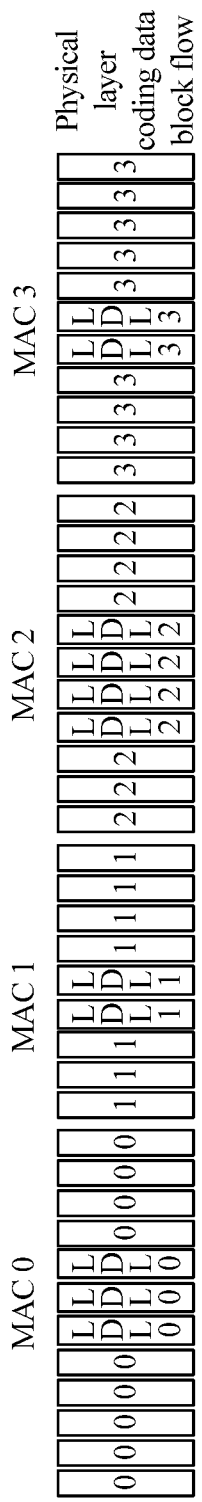
FIG. 5 is a flowchart of still another data processing method according to an embodiment of the present disclosure.

Exemplarily, as shown in FIG. 5, it is assumed that the four physical layer coding data block flows are a first physical layer coding data block flow (MAC0), a second physical layer coding data block flow (MAC1), a third physical layer coding data block flow (MAC2), and a fourth physical layer coding data block flow (MAC3). Each physical layer coding data block flow includes a valid data block and an idle data block, where the valid data block and the idle data block may be data blocks whose code is 64B/66B. In FIG. 5, a data block "0" in the first physical layer coding data block flow represents a valid data block in the first physical layer coding data block flow, and a data block "IDL0" in the first physical layer coding data block flow represents an idle data block in the first physical layer coding data block flow. In FIG. 5, a data block "1" in the second physical layer coding data block flow represents a valid data block in the second physical layer coding data block flow, and a data block "IDL1" in the second physical layer coding data block flow represents an idle data block in the second physical layer coding data block flow. In FIG. 5, a data block "2" in the third physical layer coding data block flow represents a valid data block in the third physical layer coding data block flow, and a data block "IDL2" in the third physical layer coding data block flow represents an idle data block in the third physical layer coding data block flow. In FIG. 5, a data block "3" in the fourth physical layer coding data block flow represents a valid data block in the fourth physical layer coding data block flow, and a data block "IDL3" in the fourth physical layer coding data block flow represents an idle data block in the fourth physical layer coding data block flow.

Step 202: Delete some idle data blocks in each physical layer coding data block flow.

For example, a physical layer coding data block flow may include multiple idle data blocks. The multiple idle data blocks may be obtained according to an Ethernet inter-packet gap (IPG).

After some idle data blocks in the physical layer coding data block flow are deleted, space corresponding to the some deleted idle data blocks may be used to carry an added overhead of the data block flow in a subsequent transmission process. The overhead may be added by a flexible intermediate interface layer, or may be added by a physical medium dependent sublayer.

Figure 6:
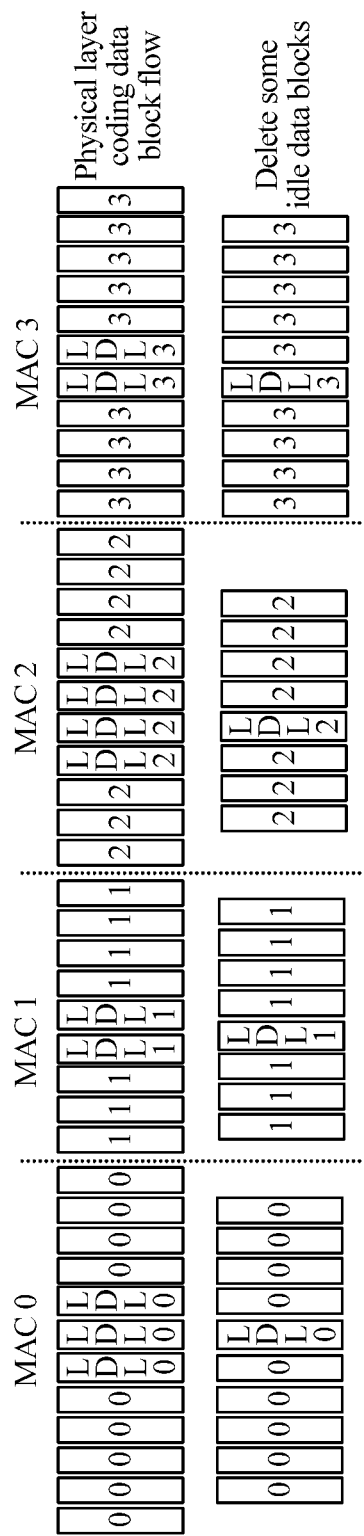
FIG. 6 is a flowchart of yet another data processing method according to an embodiment of the present disclosure.

Exemplarily, based on FIG. 5, as shown in FIG. 6, the second row shows the physical layer coding data block flows after idle data blocks are deleted. Two idle data blocks in the first physical layer coding data block flow are deleted. One idle data block in the second physical layer coding data block flow is deleted. Three idle data blocks in the third physical layer coding data block flow are deleted. One idle data block in the fourth physical layer coding data block flow is deleted.

Step 203: Obtain a first data flow according to the four physical layer coding data block flows.

Time division multiplexing (TDM) is performed on data blocks in each physical layer coding data block flow to constitute multiple sub-data flows, where the multiple sub-data flows constitute the first data flow. The first data flow includes the multiple sub-data flows, where a quantity of data blocks included in each sub-data flow is equal to C, C is greater than or equal to 2, and C is an integer. A ratio of rates of data blocks that are from all physical layer coding data block flows and are in each sub-data flow is equal to a ratio of rates of all the physical layer coding data block flows.

For example, a ratio of a rate of data blocks that are from the first physical layer coding data block flow and are in each sub-data flow to a rate of data blocks that are from the second physical layer coding data block flow and are in each sub-data flow is equal to a ratio of a rate of the first physical layer coding data block flow to a rate of the second physical layer coding data block flow. A ratio of the rate of the data blocks that are from the second physical layer coding data block flow and are in each sub-data flow to a rate of data blocks that are from the third physical layer coding data block flow and are in each sub-data flow is equal to a ratio of the rate of the second physical layer coding data block flow to a rate of the third physical layer coding data block flow. A ratio of the rate of the data blocks that are from the third physical layer coding data block flow and is in each sub-data flow to a rate of data blocks that are from the fourth physical layer coding data block flow and are in each sub-data flow is equal to a ratio of the rate of the third physical layer coding data block flow to a rate of the fourth physical layer coding data block flow.

Figure 7:
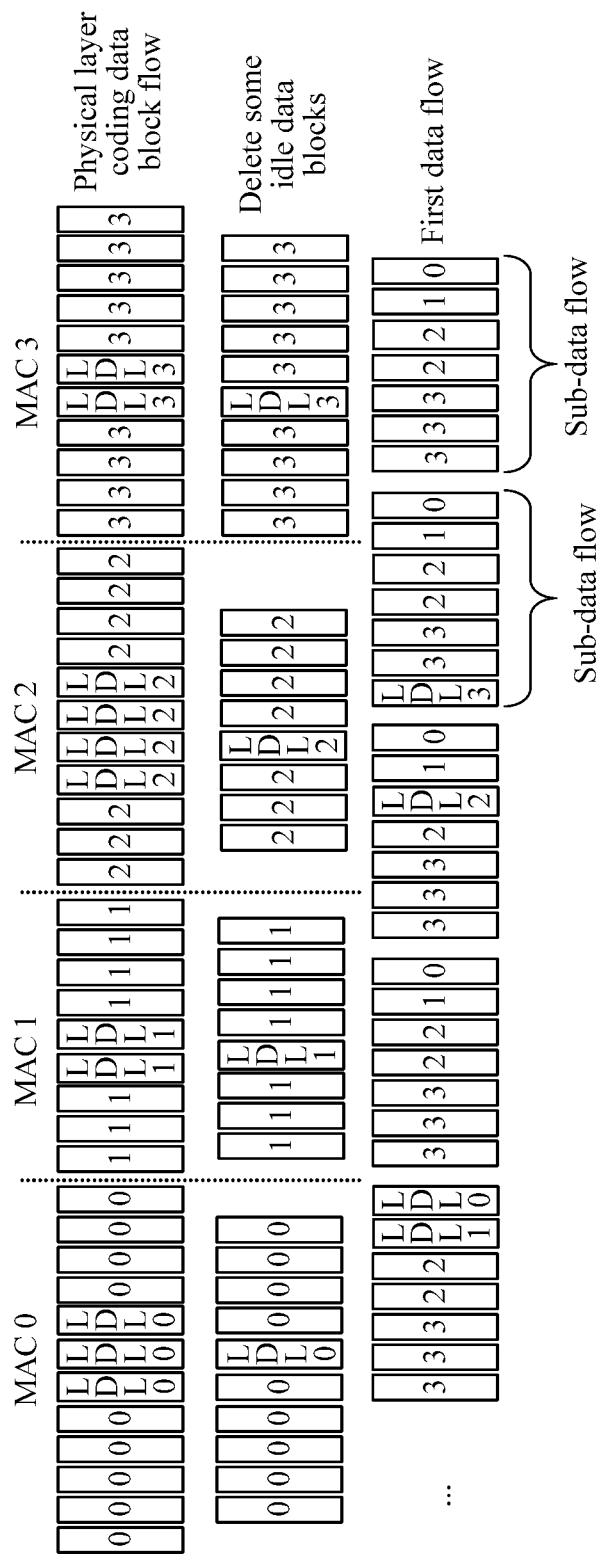
FIG. 7 is a flowchart of still yet another data processing method according to an embodiment of the present disclosure.

Exemplarily, based on FIG. 6, as shown in FIG. 7, it is assumed that a ratio among the rates of the first physical layer coding data block flow (MAC0), the second physical layer coding data block flow (MAC1), the third physical layer coding data block flow (MAC2), and the fourth physical layer coding data block flow (MAC3) is 1:1:2:3. The first data block on the right of the third row is the first data block "0" on the right of the MAC0 data flow in the second row; the second data block on the right of the third row is the first data block "1" on the right of the MAC1 data flow; the third data block on the right of the third row is the first data block "2" on the right of the MAC2 data flow; the fourth data block on the right of the third row is the second data block "2" on the right of the MAC2 data flow; the fifth data block on the right of the third row is the first data block "3" on the right of the MAC3 data flow; the sixth data block on the right of the third row is the second data block "3" on the right of the MAC3 data flow; and the seventh data block on the right of the third row is the third data block "3" on the right of the MAC3 data flow. The first data block "0" on the right of the first physical layer coding data block flow, the first data block "1" on the right of the second physical layer coding data block flow, the first data block "2" on the right of the third physical layer coding data block flow, the second data block "2" on the right of the third physical layer coding data block flow, the first data block "3" on the right of the fourth physical layer coding data block flow, the second data block "3" on the right of the fourth physical layer coding data block flow, and the third data block "3" on the right of the fourth physical layer coding data block flow constitute a sub-data flow.

Similarly, by analogy, time division multiplexing is performed on data blocks in the MAC0, the MAC1, the MAC2, and the MAC3 according to that the ratio between the rates of the data blocks that are from all the physical layer coding data block flows and are in each sub-data flow is equal to the ratio between the rates of all the physical layer coding data block flows, so as to constitute multiple sub-data flows and obtain the first data flow.

Step 204: Generate multiple subframe headers.

The multiple subframe headers are obtained according to a frame header. The frame header includes a length field, a flow quantity field, a first data block quantity field, and a second data block quantity field, where the length field is used to indicate a length of the frame header, the flow quantity field is used to indicate a quantity of physical layer coding data block flows included in the first data flow, the first data block quantity field is used to indicate a quantity of data blocks that are included in each sub-data flow and are from the first physical layer coding data block flow, and the second data block quantity field is used to indicate a quantity of data blocks that are included in each sub-data flow and are from the second physical layer coding data block flow.

Figure 8:
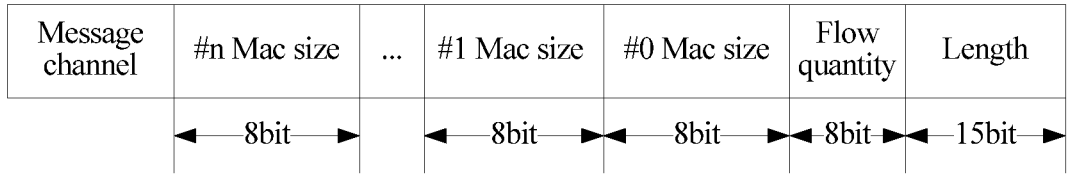
FIG. 8 is a schematic structural diagram of a frame header according to an embodiment of the present disclosure.

Exemplarily, FIG. 8 is a schematic structural diagram of a frame header. The frame header includes a length (Hdr size) field, a flow quantity (#Mac) field, a #0 Mac size field, a #1 Mac size field, a #n Mac size field, and a message channel (Message channel) field. The length (Hdr size) field is used to indicate a length of a frame header of the first data flow, a unit may be a byte (byte), and the length (Hdr size) field may be 15 bits. The flow quantity field is used to indicate a quantity of physical layer coding data block flows included in the first data flow, and may be 8 bits. The #0 Mac size field is used to indicate a quantity of data blocks that are included in each sub-data flow and are from the first physical layer coding data block flow, and may be 8 bits; the #1 Mac size field is used to indicate a quantity of data blocks that are included in each sub-data flow and are from the second physical layer coding data block flow, and may be 8 bits; similarly, the #n Mac size field is used to indicate a quantity of data blocks that are included in each sub-data flow and are from an $n^{th}$ physical layer coding data block flow, and may be 8 bits.

Figure 9:
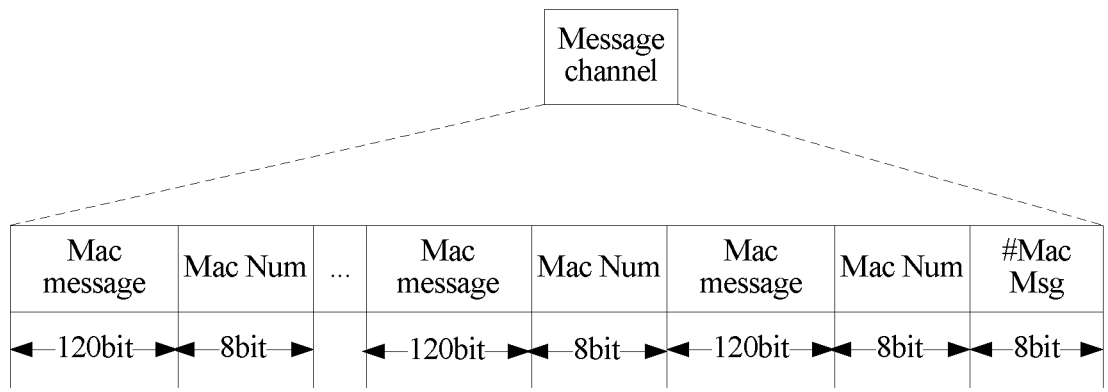
FIG. 9 is a schematic structural diagram of a message channel field according to an embodiment of the present disclosure.

Optionally, the message channel) field is used to indicate a message channel of each physical layer coding data block flow. FIG. 9 is a schematic structural diagram of a message channel field. The message channel field includes a #Mac Msg field, a Mac Num field, and a Mac message field. The #Mac Msg field is used to indicate a total quantity of messages of a physical layer coding data block flow in the Message channel field, and may be 8 bits; the Mac Num field is used to indicate a serial number of the physical layer coding data block flow, and may be 8 bits; and the Mac message field is used to indicate a message of the physical layer coding data block flow corresponding to the serial number of the Mac Num field, and may be 120 bits.

The frame header is divided to generate the multiple subframe headers, where the frame header includes multiple payload fields, and the multiple subframe headers include the multiple payload fields, where each subframe header includes only one payload field and a subframe header marker field used to indicate whether the only one payload field is the first subframe header in the multiple subframe headers, each subframe header is one or more data blocks, the multiple subframe headers further include multiple beginning flag fields, and each subframe header includes only one beginning flag field, where the only one beginning flag field is used to indicate a start of a subframe header in which the only one beginning flag field is located, and the only one beginning flag field is a data block.

Figure 10:
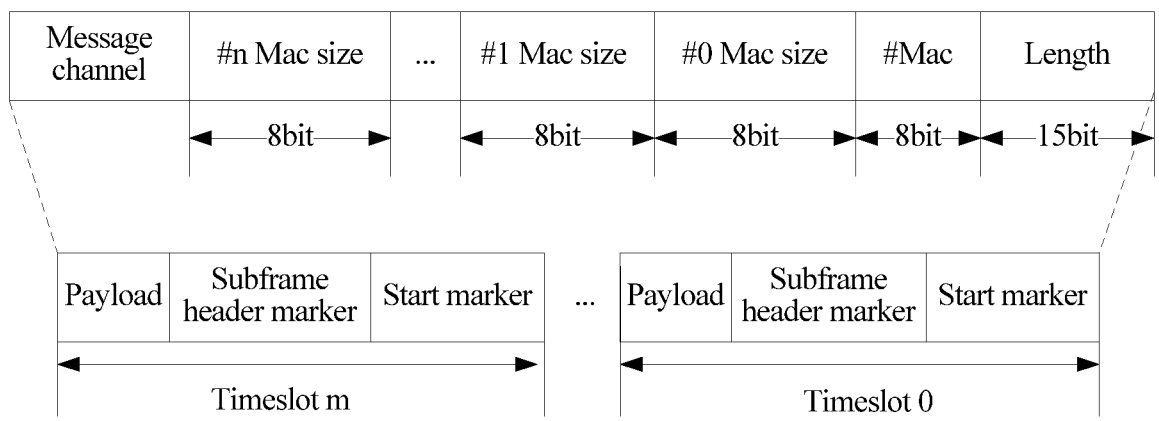
FIG. 10 is a schematic structural diagram of a subframe header according to an embodiment of the present disclosure.

FIG. 10 is a schematic structural diagram of a subframe header. The frame header is divided to generate the multiple subframe headers. The beginning flag fields may be represented by "B". The payload fields may be represented by "C0, C1, C2 to Cn". The subframe header marker field may be represented by "EP". It is assumed that a value of an EP field in the first subframe header is set to 1, which indicates the first subframe header. A value of an EP field in another subframe header is set to 0, which indicates a non-first subframe header. It is assumed that the frame header needs to be completely transmitted once in a $0^{th}$ frame, and it is changed that the frame header is to be separately transmitted in different frames, such as the $0^{th}$ frame, a first frame, and a second frame.

Step 205: Obtain a second data flow according to the first data flow and the multiple subframe headers.

The second data flow includes the first data flow and the multiple subframe headers. Each subframe header in the multiple subframe headers in the second data flow is located between two adjacent sub-data flows in the multiple sub-data flows, that is, two adjacent subframe headers in the multiple subframe headers in the second data flow are separated by P sub-data flows, where the P sub-data flows are sub-data flows in the multiple sub-data flows, and P is an integer. The subframe headers may be inserted into the first data flow at an interval of P sub-data flows, starting before the first data block in the first data flow.

Figure 11:
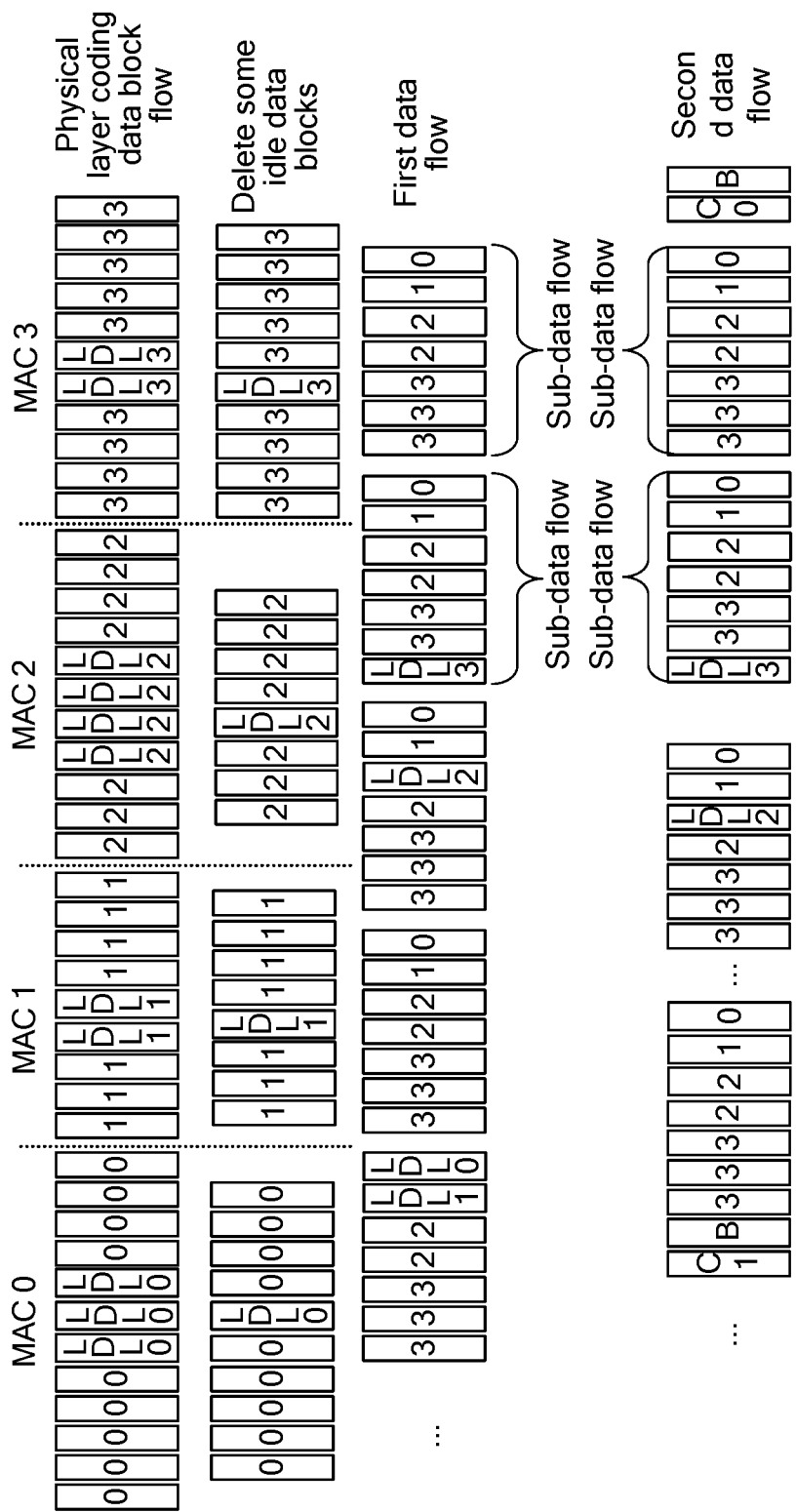
FIG. 11 is a flowchart of a still yet another data processing method according to an embodiment of the present disclosure.

With reference to FIG. 7, as shown in FIG. 11, the fourth row shows the second data flow. The second data flow is obtained in the following way: inserting the subframe headers into the first data flow at an interval of P sub-data flows, starting before the first data block in the first data flow. Each subframe header and P sub-data flows after the subframe headers may be transmitted in different timeslots.

Step 206: Distribute a data block in the second data flow to a first PMD sublayer circuit and to a second PMD sublayer circuit, so as to obtain a first PMD sublayer data flow and a second PMD sublayer data flow.

It is assumed that when the data block in the second data flow is a 64B/66B data block, the data block in the second data flow may be distributed according to a proportion of bandwidth of the first physical medium dependent sublayer to bandwidth of second physical medium dependent with a unit of an integer multiple of the data block in the second data flow, that is, a 256B/256B data block four times the 64B/66B data block or a 512B/512B data block seven times the 64B/66B data block.

When the data block in the second data flow is distributed according to a bandwidth proportion of at least two physical medium dependent, an alignment marker is simultaneously inserted between data blocks distributed to all physical medium dependent, at an interval of a quantity of data blocks in the bandwidth proportion of the at least two physical medium dependent, where the alignment marker is used to align multiple PMD sublayer data flows, and a serial number of each alignment marker is different. It should be noted that there is no need to differentiate between a subframe header and data blocks that are in the second data flow, which are both considered as data blocks.

The first PMD sublayer data flow further includes a first PMD sublayer alignment marker, and the second PMD sublayer data flow further includes a second PMD sublayer alignment marker, where the first PMD sublayer alignment marker and the second PMD sublayer alignment marker are used to align the first PMD sublayer data flow with the second PMD sublayer data flow, a rate of the data blocks that are in the second data flow and are distributed to the first PMD sublayer circuit is R1, a rate of the data blocks that are in the second data flow and are distributed to the second PMD sublayer circuit is R2, a rate of the first PMD sublayer alignment marker in the first PMD sublayer data flow is R3, a rate of the second PMD sublayer alignment marker in the second PMD sublayer data flow is R4, bandwidth of the first PMD sublayer circuit is R5, and bandwidth of the second PMD sublayer circuit is R6, where (R1+R3)/(R2+R4)=R5/R6, R1+R3 is less than R5, R2+R4 is less than R6, R1 is greater than 0, R2 is greater than 0, R3 is greater than 0, R4 is greater than 0, R5 is greater than 0, and R6 is greater than 0.

Figure 12A:
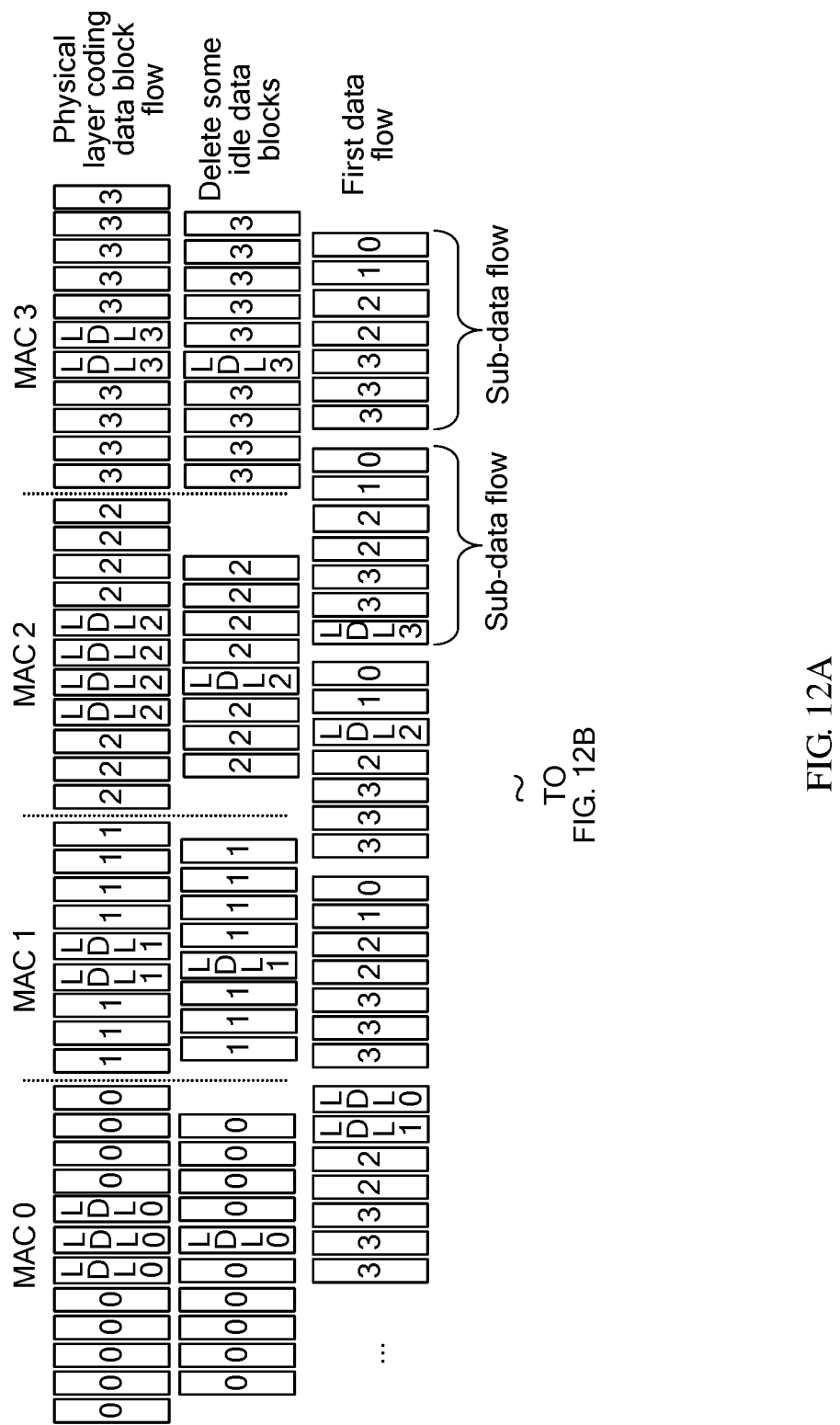
FIG. 12A and FIG. 12B are a flowchart of a still yet another data processing method according to an embodiment of the present disclosure.
Figure 12B:
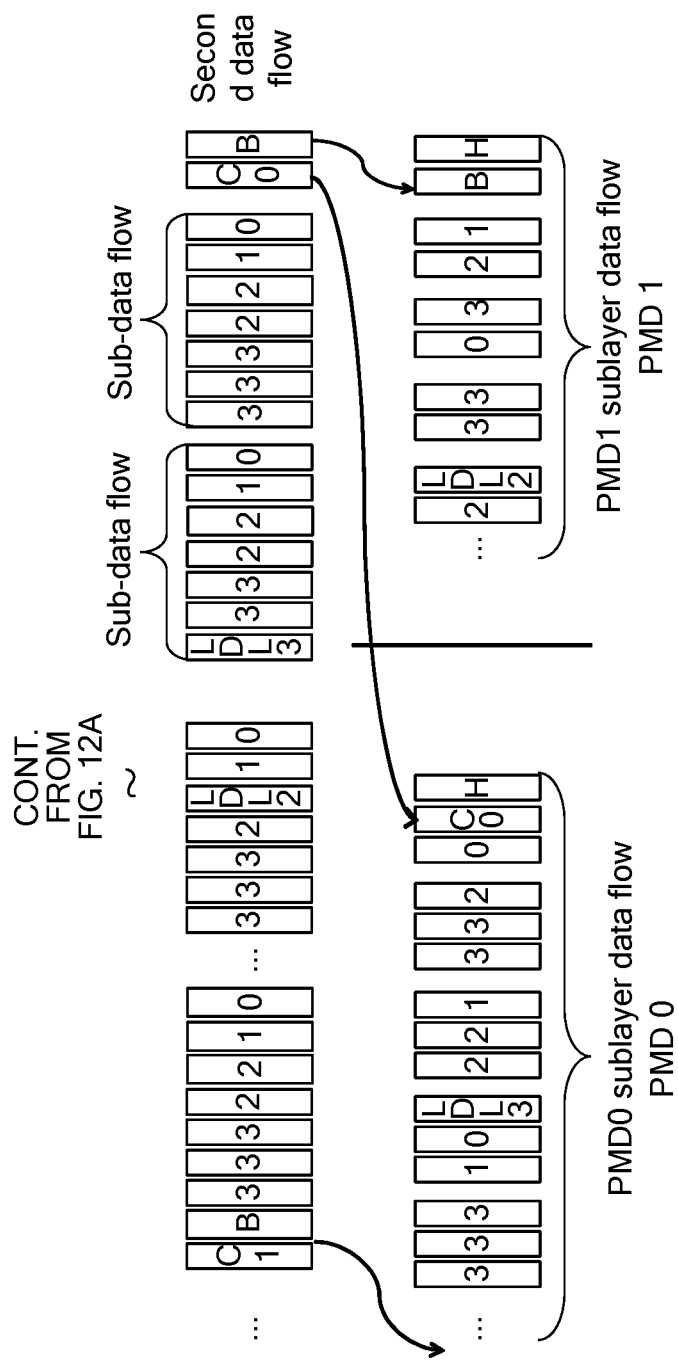

Exemplarily, based on FIG. 11, as shown in FIG. 12A and FIG. 12B, it is assumed that a bandwidth proportion of PMD0 to PMD1 is 3:2. When three data blocks in the second data flow are distributed to the PMD0, two data blocks in the second data flow are distributed to the PMD1. The first data block of the PMD1 in the fifth row is an alignment marker "H", the second data block of the PMD1 is a data block with a beginning flag "B" in the second data flow, the first data block of the PMD0 is an alignment marker "H", and the second data block of the PMD0 is a C0 data block in the second data flow. By analogy, the first PMD sublayer data flow and the second PMD sublayer data flow are obtained. The first PMD sublayer circuit corresponds to the first PMD sublayer data flow, and the second PMD sublayer circuit corresponds to the second PMD sublayer data flow.

It should be noted that the first PMD sublayer data flow further includes an idle data block and a first physical layer overhead, and the second PMD sublayer data flow further includes an idle data block and a second physical layer overhead, where a rate of the idle data block in the first PMD sublayer data flow is R7, a rate of the idle data block in the second PMD sublayer data flow is R8, a rate of the first physical layer overhead in the first PMD sublayer data flow is R9, and a rate of the second physical layer overhead in the second PMD sublayer data flow is R10, where R1+R3+R7+R9 is equal to R5, and R2+R4+R8+R10 is equal to R6.

Figure 13A:
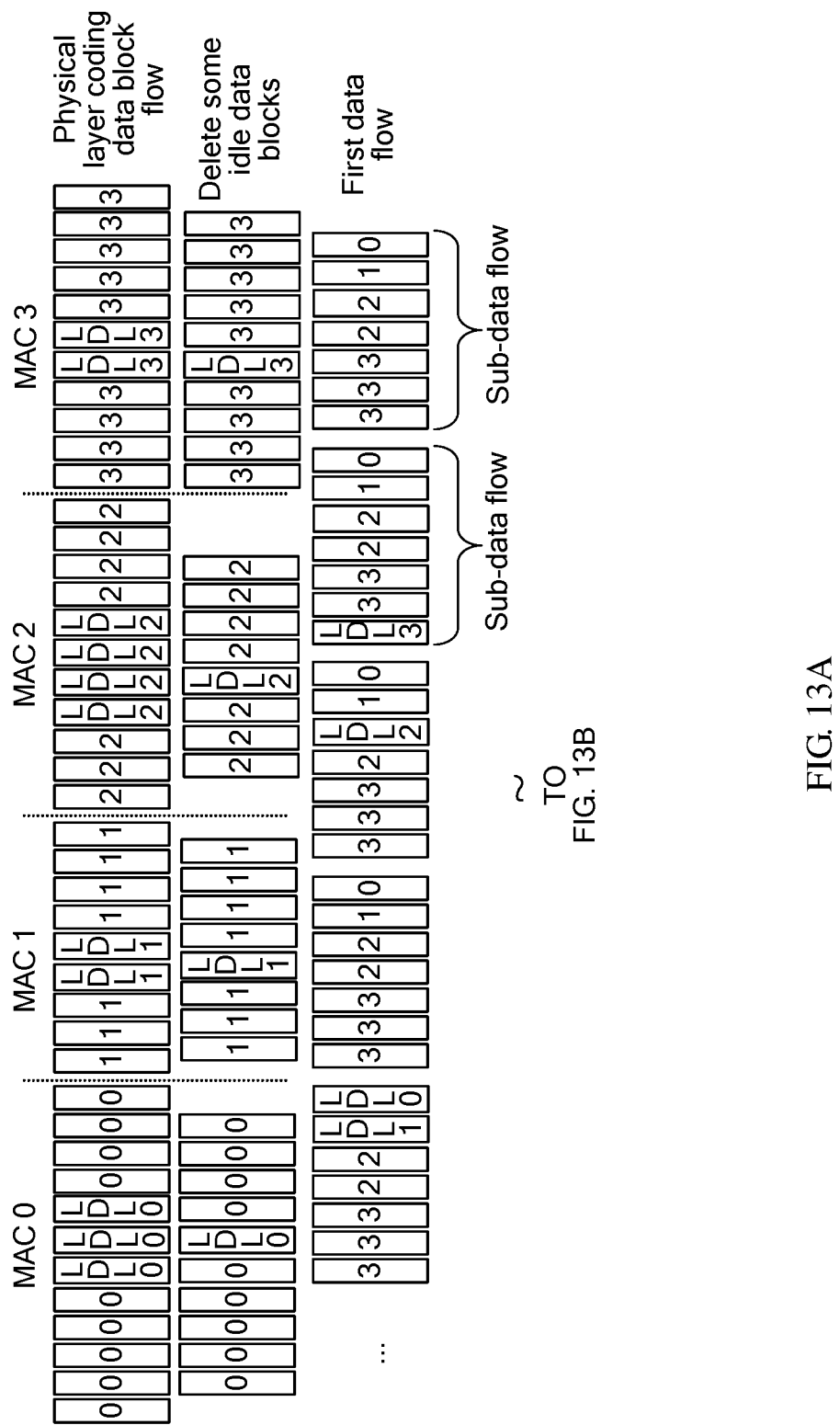
FIG. 13A and FIG. 13B are a flowchart of a still yet another data processing method according to an embodiment of the present disclosure.
Figure 13B:
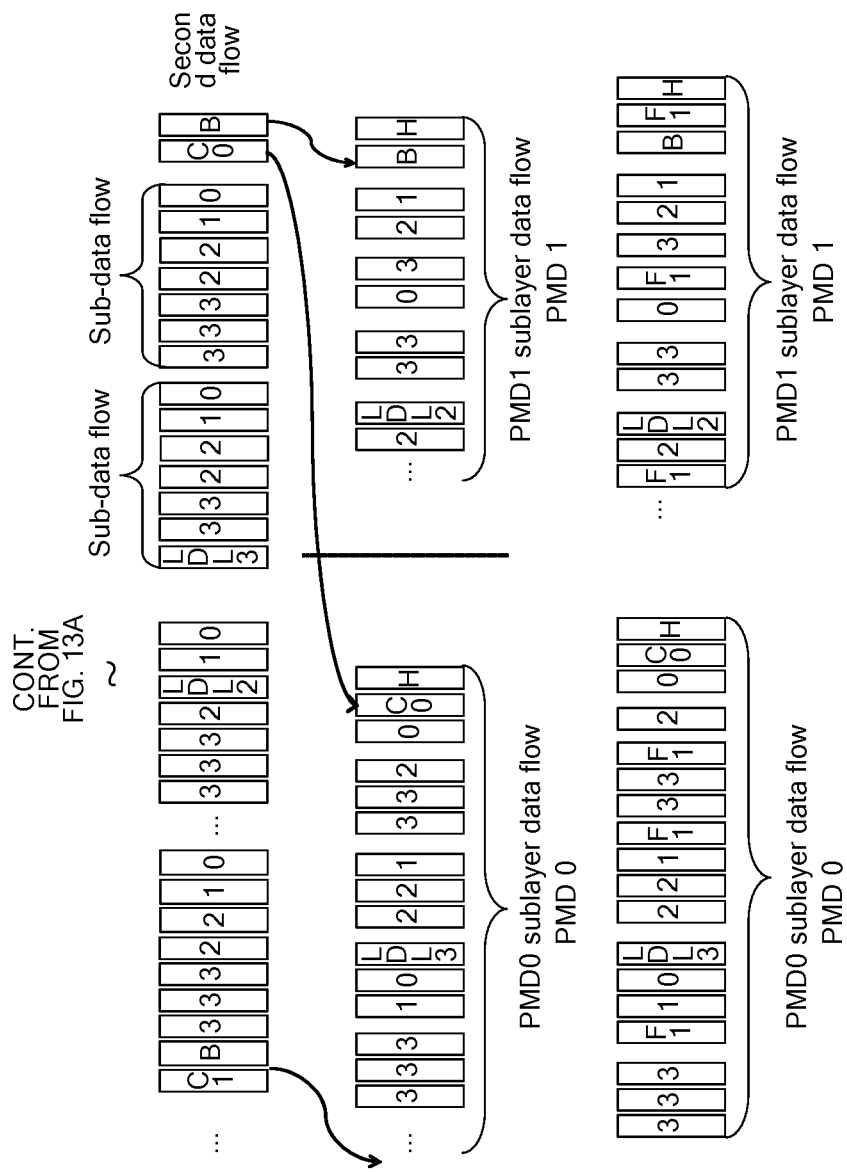

Exemplarily, based on FIG. 12A and FIG. 12B, as shown in FIG. 13A and FIG. 13B, a FI data block in the sixth row is an idle data block inserted between any data blocks in the first PMD sublayer data flow according to bandwidth of the PMD0 and bandwidth of the PMD1, or an idle data block inserted between any data blocks in the second PMD sublayer data flow.

It should be noted that the beginning flag, the alignment marker, and the idle data block in this embodiment of the present disclosure are inserted after a flexible intermediate interface layer at a transmit end encodes a 64B/66B data block and are deleted before a flexible intermediate interface layer at a receive end decodes the 64B/66B data block. Therefore, a special data block such as the beginning flag, the alignment marker, or the idle data block may be separately defined at a flexible intermediate interface layer, as long as the special data block is distinguished from a data block in the physical layer coding data block flow and a 64B/66B data block in the first data flow or the second data flow. It should be noted that how to encode the special data block in a 64B/66B scenario is described in this embodiment. For physical layer coding of another type, the special data block may also be encoded in a similar manner. Certainly, a coding manner of the special data block needs to be different from a coding manner of a defined data block, so as to distinguish the special data block.

The IEEE stipulates a 64B/66B control coding type. The IEEE 802.3-2012 clause (Clause) 8.2 is shown in Table 1.

TABLE 1

| | IEEE 802.3-2012 clause 8.2 | | | | | | | | |
|---|---|---|---|---|---|---|---|---|---|
| Input Data | Synchronization Field | Data Block Payload | | | | | | | |
| | | Bit location | | | | | | | |
| Data block format | 01 | 265 | | | | | | | |
| $D_0 D_1 D_2 D_3 D_4 D_5 D_6 D_7$ | 01 | $D_0$ | $D_1$ | $D_2$ | $D_3$ | $D_4$ | $D_5$ | $D_6$ | $D_7$ |
| Control block format | | Block type bit field | | | | | | | |
| $C_0 C_1 C_2 C_3 C_4 C_5 C_6 C_7$ | 10 | 0x1E | $C_0$ | $C_1$ | $C_2$ | $C_3$ | $C_4$ | $C_5$ | $C_6$ | $C_7$ |

TABLE 1-continued

IEEE 802.3-2012 clause 8.2

| Input Data | Synchronization Field | Data Block Payload | | | | | | | |
|---|---|---|---|---|---|---|---|---|---|
| $S_0 D_1 D_2 D_3 D_4 D_5 D_6 D_7$ | 10 | 0x78 | $D_1$ | $D_2$ | $D_3$ | $D_4$ | $D_5$ | $D_6$ | $D_7$ |
| $O_0 D_1 D_2 D_3 D_4 D_5 D_6 D_7$ | 10 | 0x4B | $D_1$ | $D_2$ | $D_3$ | $O_0$ | 0x000_0000 | | |
| $T_0 C_1 C_2 C_3 C_4 C_5 C_6 C_7$ | 10 | 0x87 | | $C_1$ | $C_2$ | $C_3$ | $C_4$ | $C_5$ | $C_6$ $C_7$ |
| $D_0 T_1 C_2 C_3 C_4 C_5 C_6 C_7$ | 10 | 0x99 | $D_0$ | | $C_2$ | $C_3$ | $C_4$ | $C_5$ | $C_6$ $C_7$ |
| $D_0 D_1 T_2 C_3 C_4 C_5 C_6 C_7$ | 10 | 0xAA | $D_0$ | $D_1$ | | $C_3$ | $C_4$ | $C_5$ | $C_6$ $C_7$ |
| $D_0 D_1 D_2 T_3 C_4 C_5 C_6 C_7$ | 10 | 0xB4 | $D_0$ | $D_1$ | $D_2$ | | $C_4$ | $C_5$ | $C_6$ $C_7$ |
| $D_0 D_1 D_2 D_3 T_4 C_5 C_6 C_7$ | 10 | 0xCC | $D_0$ | $D_1$ | $D_2$ | $D_3$ | | $C_5$ | $C_6$ $C_7$ |
| $D_0 D_1 D_2 D_3 D_4 T_5 C_6 C_7$ | 10 | 0xD2 | $D_0$ | $D_1$ | $D_2$ | $D_3$ | $D_4$ | | $C_6$ $C_7$ |
| $D_0 D_1 D_2 D_3 D_4 D_5 T_6 C_7$ | 10 | 0xE1 | $D_0$ | $D_1$ | $D_2$ | $D_3$ | $D_4$ | $D_5$ | $C_7$ |
| $D_0 D_1 D_2 D_3 D_4 D_5 D_6 T_7$ | 10 | 0xFF | $D_0$ | $D_1$ | $D_2$ | $D_3$ | $D_4$ | $D_5$ | $D_6$ |

If order_set type coding is used, a block type bit field in Table 1 is 0x4B, and bit fields after 0x4B, such as D1, D2, and D3, may be used for coding of a special character, such as a beginning flag, an alignment marker, or an idle data block. The order_set type coding is shown in Table 2. A lane1 (Lane1) of an order_set block type bit field corresponds to D1, a lane2 (Lane2) corresponds to D2, and a lane3 (Lane3) corresponds to D3. For the coding of the special character such as the beginning flag, the alignment marker, or the idle data block, existing coding in Table 2 needs to be avoided.

TABLE 2

IEEE 802.3-2012 order_set type coding

| Lane0 | Lane1 | Lane2 | Lane3 | Description |
|---|---|---|---|---|
| Sequence | 0x00 | 0x00 | 0x00 | Reserved |
| Sequence | 0x00 | 0x00 | 0x01 | Local fault |
| Sequence | 0x00 | 0x00 | 0x02 | Remote fault |
| Sequence | 0x00 | 0x00 | 0x03 | Link interruption |
| Sequence | ≥0x00 | ≥0x00 | ≥0x04 | Reserved |

A coding instance of a special character at a flexible intermediate interface layer is shown in Table 3. The flexible intermediate interface layer at the receive end receives the special character such as the beginning flag, the alignment marker, or the idle data block and performs corresponding processing and deletion, which does not affect decoding.

Figure 14:
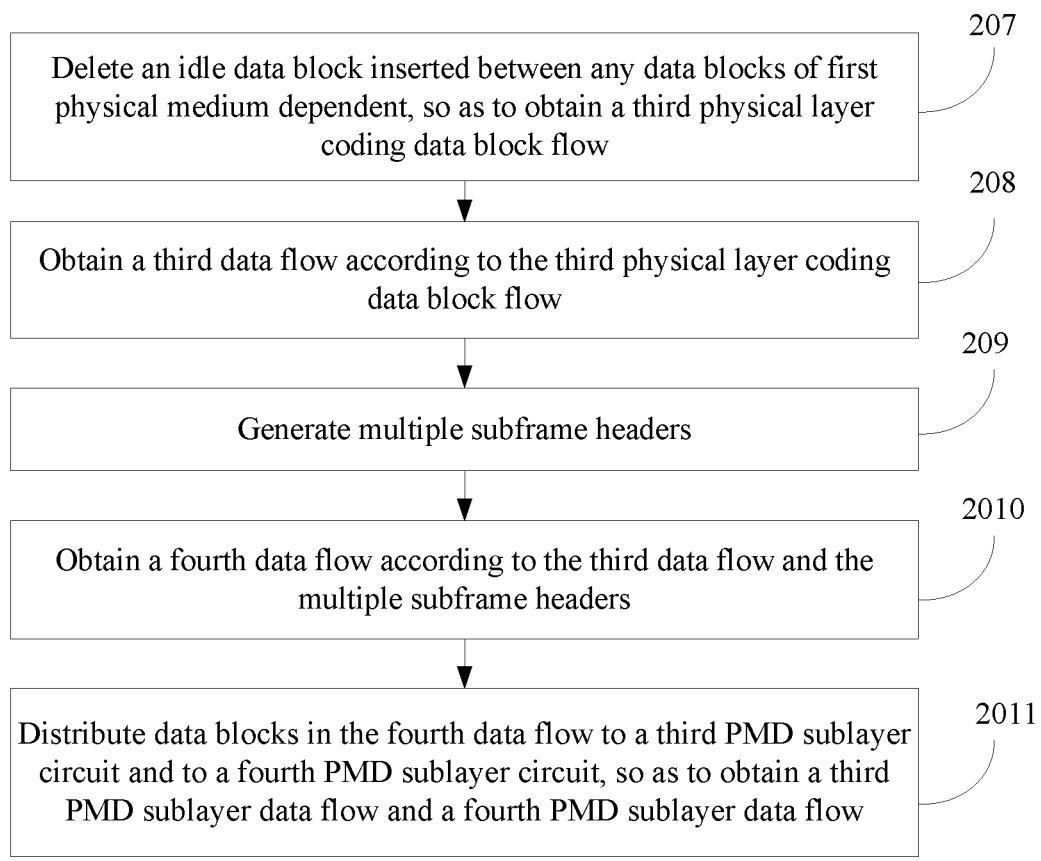
FIG. 14 is a flowchart of a method for processing flexible intermediate interface layer cascading data according to an embodiment of the present disclosure.

Further, in an application scenario in which first level physical medium dependent and second level physical medium dependent are cascaded, a first level flexible intermediate interface layer and a second level flexible intermediate interface layer are also mutually cascaded. The second level flexible intermediate interface layer receives a first level PMD sublayer data flow transmitted by the first level physical medium dependent and considers the first level PMD sublayer data flow as a second level physical layer coding data block flow, and the second level flexible intermediate interface layer processes the second level physical layer coding data block flow according to the data processing method in this embodiment of the present disclosure, so as to adapt to a second level PMD sublayer data flow transmitted by the second level physical medium dependent. After the data blocks in the second data flow are distributed to the first physical medium dependent PMD sublayer circuit and to the second PMD sublayer circuit so as to obtain the first PMD sublayer data flow and the second PMD sublayer data flow in step 206, the method further includes step 207 to step 2011. Details are shown in FIG. 14.

Step 207: Delete an idle data block inserted between any data blocks of first physical medium dependent sublayer, so as to obtain a third physical layer coding data block flow.

The idle data block in the first PMD sublayer data flow and the idle data block in the second PMD sublayer data flow are deleted by a receive physical layer circuit before the

TABLE 3

64B/66B coding of a special character at a flexible intermediate interface layer

| | Synchronization Field | Block type bit field | Data Block Payload | | | | |
|---|---|---|---|---|---|---|---|
| | | | D1 | D2 | D3 | O0 | 0x000_0000 |
| | | | Bit width | | | | |
| Character | 2 | 8 | 8 | 8 | 8 | 4 | 28 |
| Beginning flag | 10 | 0x4B | 0x02 | 0x00 | 0x00 | 0x0 | 0x000_0000 |
| "Flex Idle" | 10 | 0x4B | 0x02 | 0x01 | 0x00 | 0x0 | 0x000_0000 |
| "H0" | 10 | 0x4B | 0x01 | 0x00 | 0x00 | 0x0 | 0x000_0000 |
| "H1" | 10 | 0x4B | 0x01 | 0x01 | 0x00 | 0x0 | 0x000_0000 |
| "H2" | 10 | 0x4B | 0x01 | 0x02 | 0x00 | 0x0 | 0x000_0000 | frame header is generated according to the multiple subframe headers. As long as an idle data block is received, the idle data block is deleted.

Step 208: Obtain a third data flow according to the third physical layer coding data block flow.

TDM is performed on a data block in the third physical layer coding data block flow to constitute multiple sub-data flows, where the multiple sub-data flows constitute the third data flow. The third data flow includes the multiple sub-data flows, where a quantity of data blocks included in each sub-data flow is equal to C, C is greater than or equal to 2, and C is an integer.

Step 209: Generate multiple subframe headers.

The multiple subframe headers are obtained according to a frame header. The frame header includes a length field, a flow quantity field, and a third data block quantity field, where the length field is used to indicate a length of the frame header, the flow quantity field is used to indicate a quantity of physical layer coding data block flows included in the third data flow, and the third data block quantity field is used to indicate a quantity of data blocks that are included in each sub-data flow and are from the third physical layer coding data block flow.

Step 2010: Obtain a fourth data flow according to the third data flow and the multiple subframe headers.

The fourth data flow includes the third data flow and the multiple subframe headers. Each subframe header in the multiple subframe headers in the fourth data flow is located between two adjacent sub-data flows in the multiple sub-data flows, that is, two adjacent subframe headers in the multiple subframe headers in the fourth data flow are separated by P sub-data flows, where the P sub-data flows are sub-data flows in the multiple sub-data flows, and P is an integer. The subframe headers may be inserted into the third data flow at an interval of P sub-data flows, starting before the first data block in the third data flow.

Step 2011: Distribute data blocks in the fourth data flow to a third PMD sublayer circuit and to a fourth PMD sublayer circuit, so as to obtain a third PMD sublayer data flow and a fourth PMD sublayer data flow.

Figure 15:
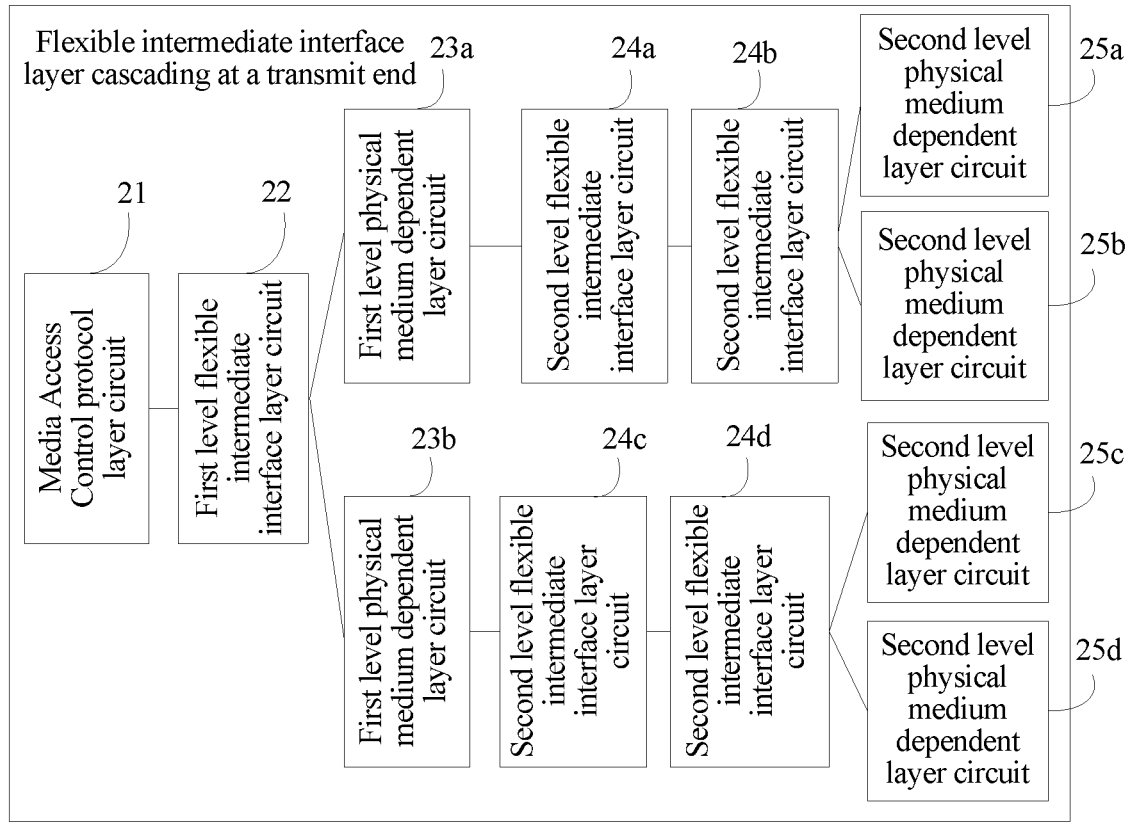
FIG. 15 is a schematic structural diagram of flexible intermediate interface layer cascading according to an embodiment of the present disclosure.
Figure 15:
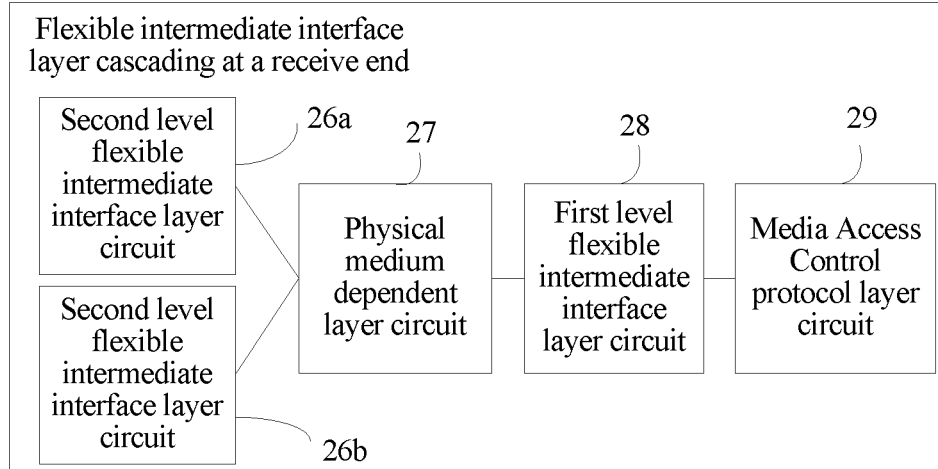

The present disclosure provides a schematic structural diagram of flexible intermediate interface layer cascading. As shown in FIG. 15, a transmit end includes a MAC layer circuit 21, a first level flexible intermediate interface layer (Flex inter layer) circuit 22, a first level physical medium dependent layer (PMD layer) circuit 23a, a first level PMD layer circuit 23b, a second level flexible intermediate interface layer circuit 24a, a second level flexible intermediate interface layer circuit 24b, a second level flexible intermediate interface layer circuit 24c, a second level flexible intermediate interface layer circuit 24d, a second level physical medium dependent layer circuit 25a, a second level physical medium dependent layer circuit 25b, a second level physical medium dependent layer circuit 25c, and a second level physical medium dependent layer circuit 25d. A receive end includes a second level flexible intermediate interface layer circuit 26a, a second level flexible intermediate interface layer circuit 26b, a physical medium dependent layer circuit 27, a first level flexible intermediate interface layer circuit 28, and a MAC protocol layer circuit 29.

It is assumed that bandwidth of the MAC protocol layer circuit 21 is 150G, bandwidth of the first level physical medium dependent layer circuit 23a is 100G, bandwidth of the first level physical medium dependent layer circuit 23b is 100G, bandwidth of the second level physical medium dependent layer circuit 25a is 40G, bandwidth of the second level physical medium dependent layer circuit 25b is 40G, bandwidth of the second level physical medium dependent layer circuit 25c is 40G, and bandwidth of the second level physical medium dependent layer circuit 25d is 40G.

The second level flexible intermediate interface layer circuit 24a is configured to delete an idle data block in a first PMD sublayer data flow. The second level flexible intermediate interface layer circuit 24b is configured to perform the foregoing coding by considering the first PMD sublayer data flow as a new physical layer coding data block flow, and distribute the first PMD sublayer data flow to the second level physical medium dependent layer circuit 25a and the second level physical medium dependent layer circuit 25b. That is, the first PMD sublayer data flow with bandwidth of 100G is distributed to the second level physical medium dependent layer circuit 25a with the bandwidth of 40G and the second level physical medium dependent layer circuit 25b with the bandwidth of 40G, so as to obtain a third PMD sublayer data flow and a fourth PMD sublayer data flow. The second level physical medium dependent layer circuit 25a transmits the third PMD sublayer data flow, and the second level physical medium dependent layer circuit 25b transmits the fourth PMD sublayer data flow.

Similarly, the second level flexible intermediate interface layer circuit 24c is configured to delete an idle data block in a second PMD sublayer data flow. The second level flexible intermediate interface layer circuit 24d is configured to perform the foregoing coding by considering the second PMD sublayer data flow as a new physical layer coding data block flow, and distribute the second PMD sublayer data flow to the second level physical medium dependent layer circuit 25c and the second level physical medium dependent layer circuit 25d. That is, the second PMD sublayer data flow with bandwidth of 100G is distributed to the second level physical medium dependent layer circuit 25c with the bandwidth of 40G and the second level physical medium dependent layer circuit 25d with the bandwidth of 40G, so as to obtain a fifth PMD sublayer data flow and a sixth PMD sublayer data flow. The second level physical medium dependent layer circuit 25c transmits the fifth PMD sublayer data flow, and the second level physical medium dependent layer circuit 25d transmits the sixth PMD sublayer data flow.

At the receive end, the second level flexible intermediate interface layer circuit 26a is configured to decode the third PMD sublayer data flow and the fourth PMD sublayer data flow according to frame header information, so as to obtain the first PMD sublayer data flow with the bandwidth of 100G, and the second level flexible intermediate interface layer circuit 26b is configured to decode the fifth PMD sublayer data flow and the sixth PMD sublayer data flow according to frame header information, so as to obtain the second PMD sublayer data flow with the bandwidth of 100G; finally, the first PMD sublayer data flow and the second PMD sublayer data flow are gathered for decoding, to restore an original physical layer coding data block flow. A specific method step is an inverse operation of the coding at the transmit end.

In the data processing method in this embodiment of the present disclosure, the MAC protocol layer circuit 21 is configured to encode a first physical layer coding data block flow with bandwidth of 150G, and transmit the first physical layer coding data block flow to the first level flexible intermediate interface layer circuit 22. The first level flexible intermediate interface layer circuit 22 is configured to, after receiving the first physical layer coding data block flow, first delete some idle data blocks in the first physical layer coding data block flow, where space of the some idle data blocks is used for subsequent overheads of a flexible intermediate interface layer circuit and a physical medium dependent layer circuit, and then perform TDM on the first physical layer coding data block flow according to the bandwidth of the MAC protocol layer circuit 21, so as to constitute a sub-data flow (TDM group), where the one TDM group includes a data block that is distributed according to the bandwidth of the MAC protocol layer circuit 21 and is in the first physical layer coding data block flow, and multiple TDM groups constitute a first data flow (TDM group stream).

The first level flexible intermediate interface layer circuit 22 is further configured to generate multiple subframe headers, where the multiple subframe headers are obtained according to a frame header, the frame header includes multiple payload fields, and the multiple subframe headers include the multiple payload fields, where each subframe header includes only one payload field and a subframe header marker field used to indicate whether the only one payload field is the first subframe header in the multiple subframe headers, each subframe header is one or more data blocks, the multiple subframe headers further include multiple beginning flag fields, and each subframe header includes only one beginning flag field, where the only one beginning flag field is used to indicate a start of a subframe header in which the only one beginning flag field is located, and the only one beginning flag field is a data block.

The frame header includes a length field, a flow quantity field, a first data block quantity field, and a second data block quantity field, where the length field is used to indicate a length of the frame header, the flow quantity field is used to indicate a quantity of physical layer coding data block flows included in the first data flow, and the first data block quantity field is used to indicate a quantity of data blocks that are included in each sub-data flow and are from the first physical layer coding data block flow.

The first level flexible intermediate interface layer circuit 22 is further configured to obtain a second data flow according to the first data flow and the multiple subframe headers, where the second data flow includes the first data flow and the multiple subframe headers. Each subframe header in the multiple subframe headers in the second data flow is located between two adjacent sub-data flows in the multiple sub-data flows.

The first level flexible intermediate interface layer circuit 22 is further configured to distribute data blocks in the second data flow to the first level physical medium dependent layer circuit 23a and to the first level physical medium dependent layer circuit 23b according to the 100G bandwidth of the first level physical medium dependent layer circuit 23a and the 100G bandwidth of the first level physical medium dependent layer circuit 23b using an integer multiple of data blocks in the first data flow as a unit, so as to obtain the first PMD sublayer data flow and the second PMD sublayer data flow. The first level physical medium dependent layer circuit 23a corresponds to the first PMD sublayer data flow, and the first level physical medium dependent layer circuit 23b corresponds to the second PMD sublayer data flow.

It should be noted that the first PMD sublayer data flow further includes a first PMD sublayer alignment marker, and the second PMD sublayer data flow further includes a second PMD sublayer alignment marker, where the first PMD sublayer alignment marker and the second PMD sublayer alignment marker are used to align the first PMD sublayer data flow with the second PMD sublayer data flow, a rate of the data blocks that are in the second data flow and are distributed to the first level physical medium dependent layer circuit 23a is R1, a rate of the data block that are in the second data flow and are distributed to the first level physical medium dependent layer circuit 23b is R2, a rate of the first PMD sublayer alignment marker in the first PMD sublayer data flow is R3, a rate of the second PMD sublayer alignment marker in the second PMD sublayer data flow is R4, the bandwidth of the first level physical medium dependent layer circuit 23a is R5, and the bandwidth of the first level physical medium dependent layer circuit 23b is R6, where (R1+R3)/(R2+R4)=R5/R6, R1+R3 is less than R5, R2+R4 is less than R6, R1 is greater than 0, R2 is greater than 0, R3 is greater than 0, R4 is greater than 0, R5 is greater than 0, and R6 is greater than 0.

The first PMD sublayer data flow further includes an idle data block and a first physical layer overhead, and the second PMD sublayer data flow further includes an idle data block and a second physical layer overhead, where a rate of the idle data block in the first PMD sublayer data flow is R7, a rate of the idle data block in the second PMD sublayer data flow is R8, a rate of the first physical layer overhead in the first PMD sublayer data flow is R9, and a rate of the second physical layer overhead in the second PMD sublayer data flow is R10, where R1+R3+R7+R9 is equal to R5, and R2+R4+R8+R10 is equal to R6.

The second level flexible intermediate interface layer circuit 24a is configured to delete the idle data block in the first PMD sublayer data flow. The second level flexible intermediate interface layer circuit 24b is configured to perform the foregoing coding by considering the first PMD sublayer data flow as a new physical layer coding data block flow, and distribute the first PMD sublayer data flow to the second level physical medium dependent layer circuit 25a and the second level physical medium dependent layer circuit 25b. That is, the first PMD sublayer data flow with the bandwidth of 100G is distributed to the second level physical medium dependent layer circuit 25a with the bandwidth of 40G and the second level physical medium dependent layer circuit 25b with the bandwidth of 40G, so as to obtain the third PMD sublayer data flow and the fourth PMD sublayer data flow. The second level physical medium dependent layer circuit 25a transmits the third PMD sublayer data flow, and the second level physical medium dependent layer circuit 25b transmits the fourth PMD sublayer data flow.

Similarly, the second level flexible intermediate interface layer circuit 24c is configured to delete the idle data block in the second PMD sublayer data flow. The second level flexible intermediate interface layer circuit 24d is configured to perform the foregoing coding by considering the second PMD sublayer data flow as a new physical layer coding data block flow, and distribute the second PMD sublayer data flow to the second level physical medium dependent layer circuit 25c and the second level physical medium dependent layer circuit 25d. That is, the second PMD sublayer data flow with the bandwidth of 100G is distributed to the second level physical medium dependent layer circuit 25c with the bandwidth of 40G and the second level physical medium dependent layer circuit 25d with the bandwidth of 40G, so as to obtain the fifth PMD sublayer data flow and the sixth PMD sublayer data flow. The second level physical medium dependent layer circuit 25c transmits the fifth PMD sublayer data flow, and the second level physical medium dependent layer circuit 25d transmits the sixth PMD sublayer data flow.

At the receive end, the second level flexible intermediate interface layer circuit 26a is configured to delete idle data blocks in the third PMD sublayer data flow and the fourth PMD sublayer data flow, and decode the third PMD sublayer data flow and the fourth PMD sublayer data flow according to frame header information, so as to obtain the first PMD sublayer data flow with the bandwidth of 100G.

The second level flexible intermediate interface layer circuit 26b is configured to delete idle data blocks in the fifth PMD sublayer data flow and the sixth PMD sublayer data flow, and decode the fifth PMD sublayer data flow and the sixth PMD sublayer data flow according to frame header information, so as to obtain the second PMD sublayer data flow with the bandwidth of 100G.

The first level flexible intermediate interface layer circuit 28 is configured to converge the first PMD sublayer data flow and the second PMD sublayer data flow for decoding, to restore the original physical layer coding data block flow. The specific method step is the inverse operation of the coding at the transmit end.

Figure 16:
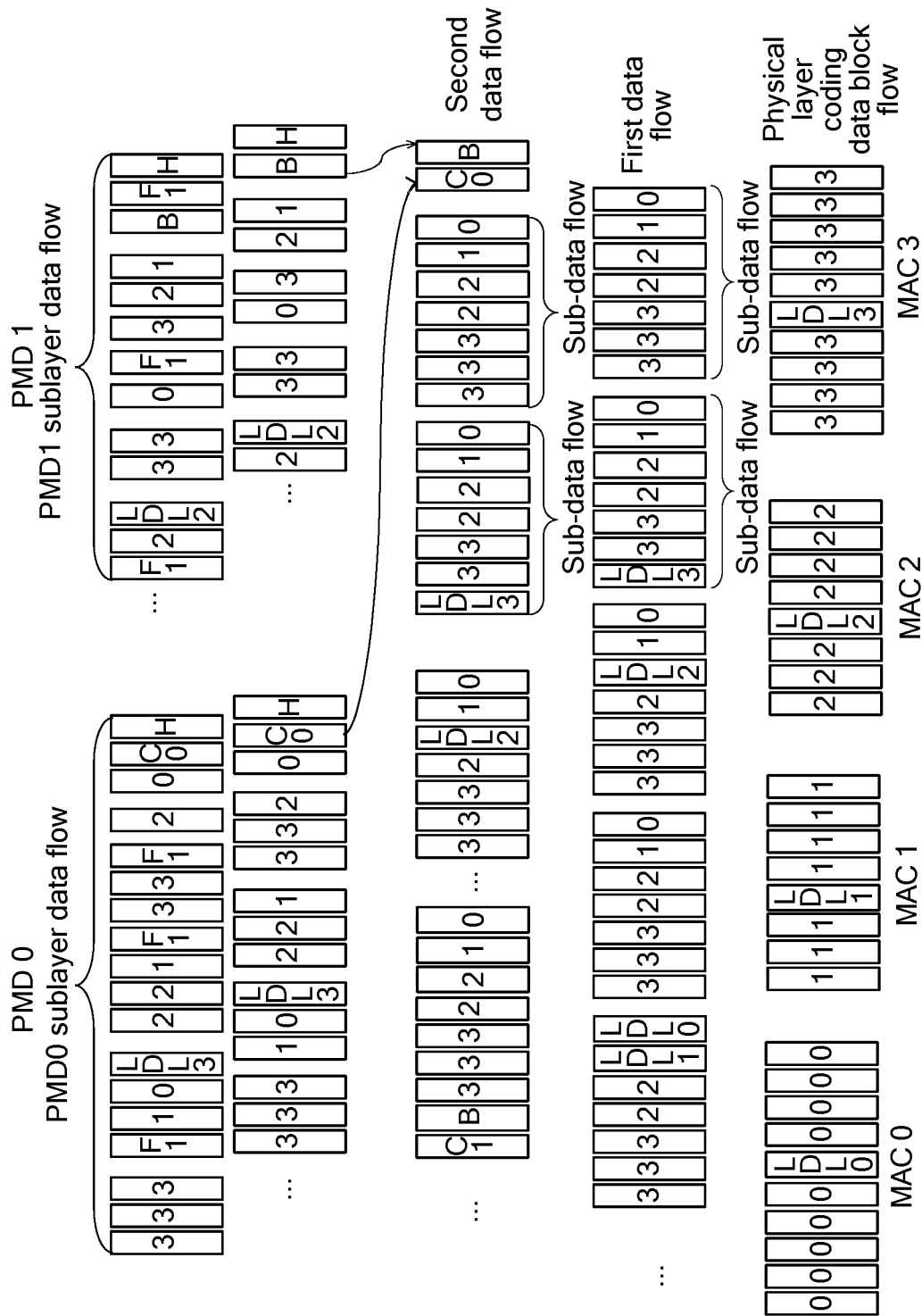
FIG. 16 is a flowchart of a still yet another data processing method according to an embodiment of the present disclosure.

Exemplarily, as shown in FIG. 16, idle data blocks "FI" in the first PMD sublayer data flow and the second PMD sublayer data flow are first deleted, and then a PMD0 sublayer alignment marker "H" and a PMD1 sublayer alignment marker "H" are aligned, where a PMD1 sublayer data flow includes a beginning flag "B". The frame header is initialized, each physical layer coding data block flow is restored, and 64B/66B decoding is performed.

Figure 17:
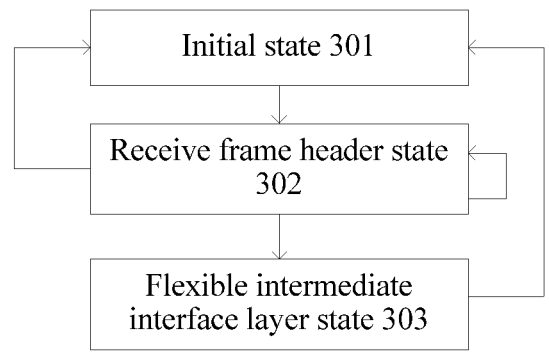
FIG. 17 is a schematic diagram of a frame header initialization state machine according to an embodiment of the present disclosure.

A frame header initialization state machine is shown in FIG. 17. After the receive end receives the first PMD sublayer data flow and the second PMD sublayer data flow that are transmitted by means of physical medium dependent, the flexible intermediate interface layer at the receive end deletes the idle data blocks. Alignment markers simultaneously inserted between data blocks distributed to all physical medium dependent are mutually aligned using the alignment markers, where data of each PMD has been aligned. After alignment is completed, a frame header initialization process is started.

In an initial state (Initial) 301, each 64B/66B data block is detected. If a data block with a beginning flag "B" is detected, and an EP 0 bit field after the data block with the beginning flag "B" is 1, the data block with the beginning flag "B" is the first data block of a flexible Ethernet data flow. Then, the initial state switches to a receive frame header state (REC Hdr) 302. If no data block with a beginning flag "B" is detected, detection continues.

In the receive frame header state (REC Hdr) 302, detection is performed once at an interval of P sub-data flows. If another "EP" is detected, detection continues until an EP 0 is encountered again. Then, the receive frame header state switches to a flexible intermediate interface layer state (Flex Lock) 303. If a detected data block is not a data block with a beginning flag "B" after detection is performed once at an interval of P sub-data flows, the receive frame header state switches to the initial state.

In the flexible intermediate interface layer state (Flex Lock) 303, detection is performed once at an interval of P sub-data flows, and if a detected data block is not a beginning flag "B", the flexible intermediate interface layer state is unlocked, and the flexible intermediate interface layer state switches to the initial state.

Figure 18:
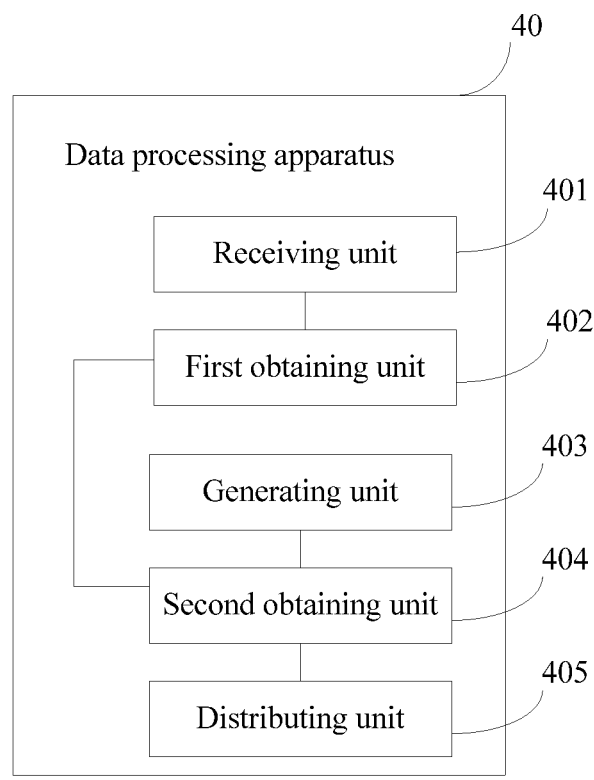
FIG. 18 is a schematic structural diagram of a data processing apparatus according to an embodiment of the present disclosure.

FIG. 18 is a schematic diagram of a data processing apparatus 40 according to an embodiment of the present disclosure. The data processing apparatus 40 may be implemented using the flexible intermediate interface layer circuit shown in FIG. 2. In addition, the data processing apparatus 40 may be configured to execute the method shown in FIG. 3. The data processing apparatus 40 may be configured to execute the method shown in FIG. 4. Referring to FIG. 18, the data processing apparatus 40 includes a receiving unit 401 configured to receive a first physical layer coding data block flow and a second physical layer coding data block flow; a first obtaining unit 402 configured to obtain a first data flow according to the first physical layer coding data block flow and the second physical layer coding data block flow that are received by the receiving unit 401, where the first data flow includes data blocks from the first physical layer coding data block flow and data blocks from the second physical layer coding data block flow, and a ratio of a rate of the data blocks that are from the first physical layer coding data block flow and are in the first data flow to a rate of the data blocks that are from the second physical layer coding data block flow and are in the first data flow is equal to a ratio of a rate of the first physical layer coding data block flow to a rate of the second physical layer coding data block flow; a generating unit 403 configured to generate multiple subframe headers, where the multiple subframe headers are obtained according to a frame header, the frame header includes multiple payload fields, and the multiple subframe headers include the multiple payload fields, where each subframe header includes only one payload field and a subframe header marker field used to indicate whether the only one payload field is the first subframe header in the multiple subframe headers, each subframe header is one or more data blocks, the multiple subframe headers further include multiple beginning flag fields, and each subframe header includes only one beginning flag field, where the only one beginning flag field is used to indicate a start of a subframe header in which the only one beginning flag field is located, and the only one beginning flag field is a data block; a second obtaining unit 404 configured to obtain a second data flow according to the first data flow obtained by the first obtaining unit 402 and the multiple subframe headers generated by the generating unit 403, where the second data flow includes the first data flow and the multiple subframe headers; and a distributing unit 405 configured to distribute data blocks in the second data flow obtained by the second obtaining unit 404 to a first physical medium dependent PMD sublayer circuit and to a second PMD sublayer circuit, so as to obtain a first PMD sublayer data flow and a second PMD sublayer data flow, where the first PMD sublayer circuit corresponds to the first PMD sublayer data flow, and the second PMD sublayer circuit corresponds to the second PMD sublayer data flow.

In the foregoing technical solution, the data blocks in the second data flow are distributed to the first PMD sublayer circuit and to the second PMD sublayer circuit. The second data flow includes the data blocks in the first physical layer coding data block flow, the data blocks in the second physical layer coding data block flow, and the multiple subframe headers. The distributed data block includes data blocks in a physical layer coding data block flow. In the prior art, a PHY includes a PCS circuit. The PCS circuit includes a physical layer coding circuit. The physical layer coding circuit may generate and output a physical layer coding data block flow. In the foregoing technical solution, a distribution operation may be executed by the PHY. The PHY may execute the distribution operation after the physical layer coding circuit executes physical layer coding. In the prior art, the distribution operation is executed by a MAC. Therefore, the foregoing technical solution is relatively flexible and is helpful in expanding application scenarios.

It should be noted that the first PMD sublayer data flow further includes a first PMD sublayer alignment marker, and the second PMD sublayer data flow further includes a second PMD sublayer alignment marker, where the first PMD sublayer alignment marker and the second PMD sublayer alignment marker are used to align the first PMD sublayer data flow with the second PMD sublayer data flow, a rate of the data blocks that are in the second data flow and are distributed to the first PMD sublayer circuit is R1, a rate of the data blocks that are in the second data flow and are distributed to the second PMD sublayer circuit is R2, a rate of the first PMD sublayer alignment marker in the first PMD sublayer data flow is R3, a rate of the second PMD sublayer alignment marker in the second PMD sublayer data flow is R4, bandwidth of the first PMD sublayer circuit is R5, and bandwidth of the second PMD sublayer circuit is R6, where (R1+R3)/(R2+R4)=R5/R6, R1+R3 is less than R5, R2+R4 is less than R6, R1 is greater than 0, R2 is greater than 0, R3 is greater than 0, R4 is greater than 0, R5 is greater than 0, and R6 is greater than 0.

The first PMD sublayer data flow further includes an idle data block and a first physical layer overhead, and the second PMD sublayer data flow further includes an idle data block and a second physical layer overhead, where a rate of the idle data block in the first PMD sublayer data flow is R7, a rate of the idle data block in the second PMD sublayer data flow is R8, a rate of the first physical layer overhead in the first PMD sublayer data flow is R9, and a rate of the second physical layer overhead in the second PMD sublayer data flow is R10, where R1+R3+R7+R9 is equal to R5, and R2+R4+R8+R10 is equal to R6.

The first data flow includes multiple sub-data flows, where a quantity of data blocks included in each sub-data flow is equal to C, a ratio of a rate of data blocks that are from the first physical layer coding data block flow and are in each sub-data flow to a rate of a data blocks that are from the second physical layer coding data block flow and are in each sub-data flow is equal to the ratio between the rate of the first physical layer coding data block flow and the rate of the second physical layer coding data block flow, C is greater than or equal to 2, and C is an integer.

The frame header includes a length field, a flow quantity field, a first data block quantity field, and a second data block quantity field, where the length field is used to indicate a length of the frame header, the flow quantity field is used to indicate a quantity of physical layer coding data block flows included in the first data flow, the first data block quantity field is used to indicate a quantity of data blocks that are included in each sub-data flow and are from the first physical layer coding data block flow, and the second data block quantity field is used to indicate a quantity of data blocks that are included in each sub-data flow and are from the second physical layer coding data block flow.

Each subframe header in the multiple subframe headers in the second data flow is located between two adjacent sub-data flows in the multiple sub-data flows.

The idle data block in the first PMD sublayer data flow and the idle data block in the second PMD sublayer data flow are deleted by a receive physical layer circuit before the frame header is generated according to the multiple subframe headers.

In this embodiment, data blocks in a physical layer coding data block flow may be all 64B/66B data blocks.

Figure 19:
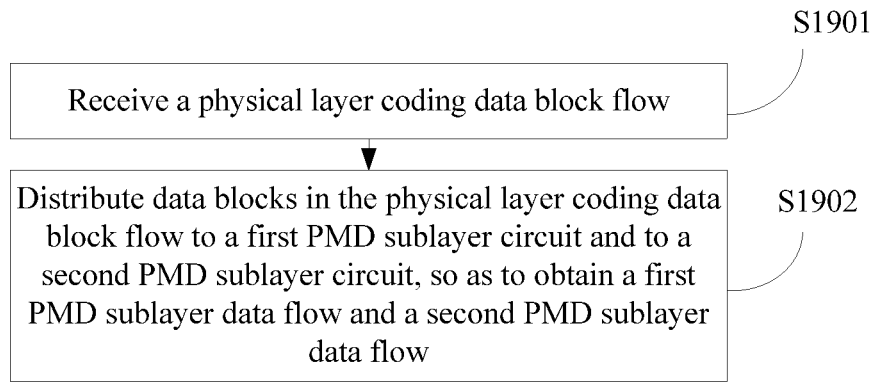
FIG. 19 is a flowchart of a still yet another data processing method according to an embodiment of the present disclosure.

In the method provided in FIG. 3, the physical layer coding data block flow includes multiple physical layer coding data block flows. The method provided in FIG. 3 may be modified, so as to obtain a method shown in FIG. 19. Only one physical layer coding data block flow is involved in the method shown in FIG. 19. FIG. 19 is a schematic flowchart of a data processing method according to an embodiment. Referring to FIG. 19, the method includes the following steps.

S1901. Receive a physical layer coding data block flow.

S1902. Distribute data blocks in the physical layer coding data block flow to a first physical medium dependent PMD sublayer circuit and to a second PMD sublayer circuit, so as to obtain a first PMD sublayer data flow and a second PMD sublayer data flow.

The first PMD sublayer circuit corresponds to the first PMD sublayer data flow, and the second PMD sublayer circuit corresponds to the second PMD sublayer data flow.

When the method provided in FIG. 19 is implemented, reference may be made to the description in the embodiment corresponding to FIG. 3, and details are not described herein again.

Optionally, in the foregoing technical solution, the first PMD sublayer data flow further includes a first PMD sublayer alignment marker, and the second PMD sublayer data flow further includes a second PMD sublayer alignment marker, where the first PMD sublayer alignment marker and the second PMD sublayer alignment marker are used to align the first PMD sublayer data flow with the second PMD sublayer data flow, a rate of the data blocks that are in the physical layer coding data block flow and are distributed to the first PMD sublayer circuit is R1, a rate of the data blocks that are in the physical layer coding data block flow and are distributed to the second PMD sublayer circuit is R2, a rate of the first PMD sublayer alignment marker in the first PMD sublayer data flow is R3, a rate of the second PMD sublayer alignment marker in the second PMD sublayer data flow is R4, bandwidth of the first PMD sublayer circuit is R5, and bandwidth of the second PMD sublayer circuit is R6, where (R1+R3)/(R2+R4)=R5/R6, R1+R3 is less than R5, R2+R4 is less than R6, R1 is greater than 0, R2 is greater than 0, R3 is greater than 0, R4 is greater than 0, R5 is greater than 0, and R6 is greater than 0.

Optionally, in the foregoing technical solution, the first PMD sublayer data flow further includes an idle data block IDLE and a first physical layer overhead, and the second PMD sublayer data flow further includes IDLE and a second physical layer overhead, where a rate of the IDLE in the first PMD sublayer data flow is R7, a rate of the IDLE in the second PMD sublayer data flow is R8, a rate of the first physical layer overhead in the first PMD sublayer data flow is R9, and a rate of the second physical layer overhead in the second PMD sublayer data flow is R10, where R1+R3+R7+R9 is equal to R5, and R2+R4+R8+R10 is equal to R6.

Figure 20:
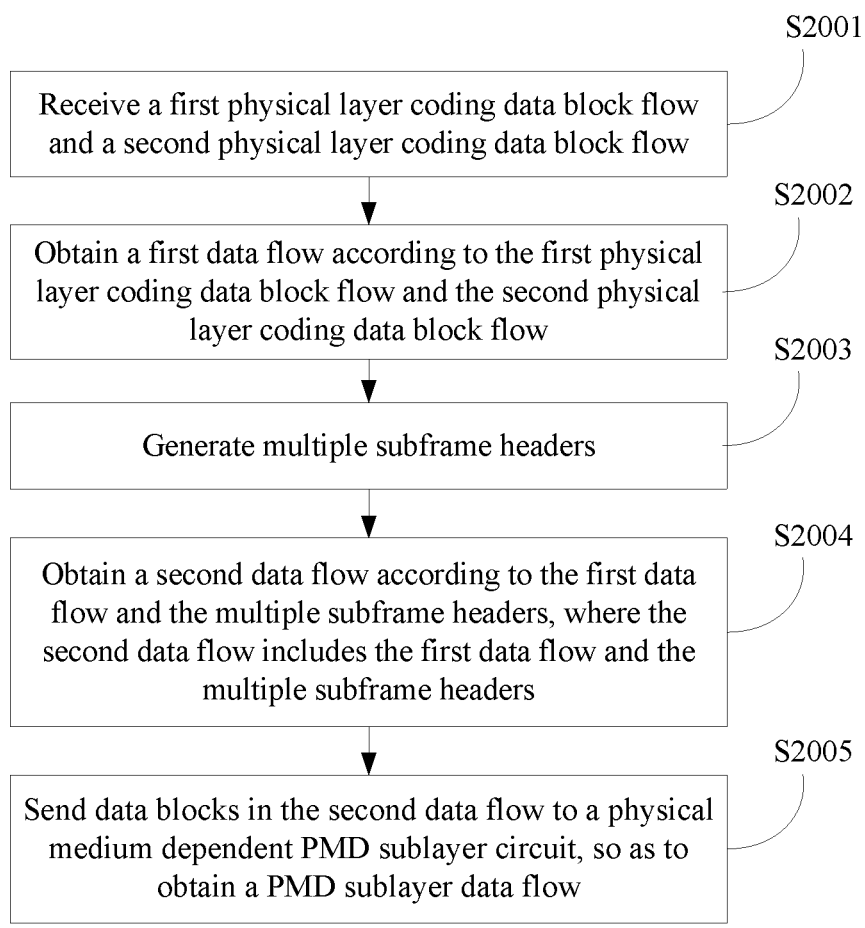
FIG. 20 is a flowchart of a still yet another data processing method according to an embodiment of the present disclosure.

Multiple PMD sublayer circuits are involved in the method provided in FIG. 3. The method provided in FIG. 3 may be modified, so as to obtain a method shown in FIG. 20. Only one PMD sublayer circuit is involved in the method provided in FIG. 20. FIG. 20 is a schematic flowchart of a data processing method according to an embodiment. Referring to FIG. 20, the method includes the following steps.

S2001. Receive a first physical layer coding data block flow and a second physical layer coding data block flow.

S2002. Obtain a first data flow according to the first physical layer coding data block flow and the second physical layer coding data block flow.

The first data flow includes data blocks from the first physical layer coding data block flow and data blocks from the second physical layer coding data block flow, where a ratio of a rate of the data block that are from the first physical layer coding data block flow and are in the first data flow to a rate of the data block that are from the second physical layer coding data block flow and are in the first data flow is equal to a ratio of a rate of the first physical layer coding data block flow to a rate of the second physical layer coding data block flow.

S2003. Generate multiple subframe headers.

The multiple subframe headers are obtained according to a frame header, the frame header includes multiple payload fields, and the multiple subframe headers include the multiple payload fields, where each subframe header includes only one payload field and a subframe header marker field used to indicate whether the only one payload field is the first subframe header in the multiple subframe headers, each subframe header is one or more data blocks, the multiple subframe headers further include multiple beginning flag fields, and each subframe header includes only one beginning flag field, where the only one beginning flag field is used to indicate a start of a subframe header in which the only one beginning flag field is located, and the only one beginning flag field is a data block.

S2004. Obtain a second data flow according to the first data flow and the multiple subframe headers, where the second data flow includes the first data flow and the multiple subframe headers.

S2005. Send data blocks in the second data flow to a physical medium dependent PMD sublayer circuit, so as to obtain a PMD sublayer data flow.

The PMD sublayer circuit corresponds to the PMD sublayer data flow.

When the method provided in FIG. 20 is implemented, reference may be made to the description in the embodiment corresponding to FIG. 3, and details are not described herein again.

Optionally, in the foregoing technical solution, a rate of the data blocks that are in the second data flow and are distributed to the PMD sublayer circuit is R1, and bandwidth of the PMD sublayer circuit is R2, where R1 is less than R2, R1 is greater than 0, and R2 is greater than 0.

Optionally, in the foregoing technical solution, the PMD sublayer data flow further includes an idle data block IDLE and a physical layer overhead, where a rate of the IDLE in the PMD sublayer data flow is R3, a rate of the physical layer overhead in the PMD sublayer data flow is R4, and R1+R3+R4 is equal to R2.

The data processing method in this embodiment of the present disclosure may also be applied to an optical network device in an optical network.

It may be clearly understood by a person skilled in the art that, for the purpose of convenient and brief description, for a detailed working process of the foregoing apparatus and unit, reference may be made to a corresponding process in the foregoing method embodiments, and details are not described herein again.

In the several embodiments provided in the present application, it should be understood that the disclosed apparatus and method may be implemented in other manners. For example, the described apparatus embodiment is merely exemplary. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms. The units described as separate parts may or may not be physically separate, and parts displayed as units may or may not be physical units, may be located in one position, or may be distributed on multiple network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The foregoing integrated unit may be implemented in a form of hardware, or may be implemented in a form of hardware in addition to a software functional unit.

A person of ordinary skill in the art may understand that all or some of the steps of the foregoing method embodiments may be implemented by a program instructing relevant hardware. The foregoing program may be stored in a computer readable storage medium. When the program runs, the steps of the foregoing method embodiments are performed. The foregoing storage medium includes any medium that can store program code, such as a read-only memory (ROM), a random access memory (RAM), a magnetic disk, or an optical disc. The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A data processing method, comprising:
receiving a first physical layer coding data block flow and a second physical layer coding data block flow;
obtaining a first data flow according to the first physical layer coding data block flow and the second physical layer coding data block flow, wherein the first data flow comprises data blocks from the first physical layer coding data block flow and data blocks from the second physical layer coding data block flow;
generating multiple subframe headers, wherein the multiple subframe headers comprise multiple payload fields;
obtaining a second data flow according to the first data flow and the multiple subframe headers, wherein the second data flow comprises the first data flow and the multiple subframe headers; and
distributing data blocks in the second data flow to a first physical medium dependent (PMD) sublayer circuit and to a second PMD sublayer circuit to obtain a first PMD sublayer data flow and a second PMD sublayer data flow, wherein the first PMD sublayer circuit corresponds to the first PMD sublayer data flow, and wherein the second PMD sublayer circuit corresponds to the second PMD sublayer data flow.

2. The data processing method according to claim 1, wherein the multiple subframe headers are based on a frame header, and wherein the frame header comprises the multiple payload fields.

3. The data processing method according to claim 2, wherein each subframe header of the multiple subframe headers comprises a marker field indicating whether a payload field of the subframe header is a payload field of a first subframe header of the multiple subframe headers, and wherein the first subframe header is one or more data blocks.

4. The data processing method according to claim 2, wherein each subframe header of the multiple subframe headers comprises a beginning flag field that indicates a start of the subframe header, and wherein the beginning flag field is a data block.

5. The data processing method according to claim 1, wherein each subframe header of the multiple subframe headers comprises a marker field indicating whether a payload field of the subframe header is a payload field of a first subframe header of the multiple subframe headers, and wherein the first subframe header is one or more data blocks.

6. The data processing method according to claim 5, wherein each subframe header of the multiple subframe headers comprises a beginning flag field that indicates a start of the subframe header, and wherein the beginning flag field is a data block.

7. The data processing method according to claim 1, wherein each subframe header of the multiple subframe headers comprises a beginning flag field that indicates a start of the subframe header, and wherein the beginning flag field is a data block.

8. The data processing method according to claim 1, wherein a ratio of a rate of the data blocks from the first physical layer coding data block flow to a rate of the data blocks from the second physical layer coding data block flow is equal to a ratio of a rate of the first physical layer coding data block flow to a rate of the second physical layer coding data block flow.

9. A data processing apparatus, comprising:
a receiver configured to receive a first physical layer coding data block flow and a second physical layer coding data block flow; and
a processor coupled to the receiver and configured to:
obtain a first data flow according to the first physical layer coding data block flow and the second physical layer coding data block flow, wherein the first data flow comprises data blocks from the first physical layer coding data block flow and data blocks from the second physical layer coding data block flow;
generate multiple subframe headers, wherein the multiple subframe headers comprise multiple payload fields;
obtain a second data flow according to the first data flow and the multiple subframe headers, wherein the second data flow comprises the first data flow and the multiple subframe headers; and
distribute data blocks in the second data flow to a first physical medium dependent (PMD) sublayer circuit and to a second PMD sublayer circuit to obtain a first PMD sublayer data flow and a second PMD sublayer data flow, wherein the first PMD sublayer circuit corresponds to the first PMD sublayer data flow, and wherein the second PMD sublayer circuit corresponds to the second PMD sublayer data flow.

10. The data processing apparatus according to claim 9, wherein the multiple subframe headers are based on a frame header, and wherein the frame header comprises the multiple payload fields.

11. The data processing apparatus according to claim 10, wherein each subframe header of the multiple subframe headers comprises a marker field indicating whether a payload field of the subframe header is a payload field of a first subframe header of the multiple subframe headers, and wherein the first subframe header is one or more data blocks.

12. The data processing apparatus according to claim 10, wherein each subframe header of the multiple subframe headers comprises a beginning flag field that indicates a start of the subframe header, and wherein the beginning flag field is a data block.

13. The data processing apparatus according to claim 10, wherein a ratio of a rate of the data blocks from the first physical layer coding data block flow to a rate of the data blocks from the second physical layer coding data block flow is equal to a ratio of a rate of the first physical layer coding data block flow to a rate of the second physical layer coding data block flow.

14. The data processing apparatus according to claim 9, wherein each subframe header of the multiple subframe headers comprises a marker field indicating whether a payload field of the subframe header is a payload field of a first subframe header of the multiple subframe headers, and wherein the first subframe header is one or more data blocks.

15. The data processing apparatus according to claim 9, wherein each subframe header of the multiple subframe headers comprises a beginning flag field that indicates a start of the subframe header, and wherein the beginning flag field is a data block.

16. A non-transitory computer-readable storage medium storing executable instructions that, when executed by a computer, cause the computer to:
receive a first physical layer coding data block flow and a second physical layer coding data block flow;
obtain a first data flow according to the first physical layer coding data block flow and the second physical layer coding data block flow, wherein the first data flow comprises data blocks from the first physical layer coding data block flow and data blocks from the second physical layer coding data block flow;
generate multiple subframe headers, wherein the multiple subframe headers comprise multiple payload fields;
obtain a second data flow according to the first data flow and the multiple subframe headers, wherein the second data flow comprises the first data flow and the multiple subframe headers; and
distribute data blocks in the second data flow to a first physical medium dependent (PMD) sublayer circuit and to a second PMD sublayer circuit to obtain a first PMD sublayer data flow and a second PMD sublayer data flow, wherein the first PMD sublayer circuit corresponds to the first PMD sublayer data flow, and wherein the second PMD sublayer circuit corresponds to the second PMD sublayer data flow.

17. The computer-readable storage medium according to claim 16, wherein the multiple subframe headers are based on a frame header, and wherein the frame header comprises the multiple payload fields.

18. The computer-readable storage medium according to claim 17, wherein each subframe header of the multiple subframe headers comprises a marker field indicating whether a payload field of the subframe header is a payload field of a first subframe header of the multiple subframe headers, and wherein the first subframe header is one or more data blocks.

19. The computer-readable storage medium according to claim 17, wherein each subframe header of the multiple subframe headers comprises a beginning flag field that indicates a start of the subframe header, and wherein the beginning flag field is a data block.

20. The computer-readable storage medium according to claim 16, wherein a ratio of a rate of the data blocks from the first physical layer coding data block flow to a rate of the data blocks from the second physical layer coding data block flow is equal to a ratio of a rate of the first physical layer coding data block flow to a rate of the second physical layer coding data block flow.

* * * * *